(12) United States Patent
Vertosick

(10) Patent No.: US 11,789,421 B2
(45) Date of Patent: Oct. 17, 2023

(54) EFFICIENT CLIENT UPDATES USING PATIENCE DIFFERENCE ALGORITHM IN A UNIDIRECTIONAL DATA FLOW ARCHITECTURE FOR INDUSTRIAL AUTOMATION DESIGN

(71) Applicant: Rockwell Automation Technologies, Inc., Mayfield Heights, OH (US)

(72) Inventor: Jeffrey Vertosick, Brecksville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 232 days.

(21) Appl. No.: 17/406,775

(22) Filed: Aug. 19, 2021

(65) Prior Publication Data

US 2023/0058554 A1 Feb. 23, 2023

(51) Int. Cl.
*G05B 19/042* (2006.01)
*G06F 8/30* (2018.01)

(52) U.S. Cl.
CPC ..... *G05B 19/0426* (2013.01); *G05B 19/0421* (2013.01); *G06F 8/30* (2013.01); *G05B 2219/23291* (2013.01); *G05B 2219/23333* (2013.01)

(58) Field of Classification Search
None
See application file for complete search history.

(56) References Cited

U.S. PATENT DOCUMENTS

| 10,360,023 | B2 * | 7/2019 | Cowan | G06F 8/73 |
| 2011/0246869 | A1 * | 10/2011 | Vion-Dury | G06F 40/194 715/229 |
| 2018/0088936 | A1 * | 3/2018 | Tanimoto | G06F 8/65 |
| 2019/0205112 | A1 * | 7/2019 | Salameh | G06F 8/65 |
| 2020/0379752 | A1 * | 12/2020 | Rodrigues Rosa Junior | G06F 16/9014 |

* cited by examiner

*Primary Examiner* — Isaac Tuku Tecklu
(74) *Attorney, Agent, or Firm* — Amin, Turocy & Watson, LLP

(57) ABSTRACT

An industrial integrated development environment (IDE) identifies modifications to an industrial control program using a combination of program hashing and text differencing. The system performs deep-level hashing of the control program's text model to obtain hash data comprising rung-level hash values that collectively represent the current state of the program. When edits to the program are received, the modified text model is hashed again to yield modified hash data, and differencing analysis is performed on the initial and modified hash data. Differences between the two sets of hash values are used to identify portions of the control program that have been modified so that the targeted updates to a logic view of the program can be implemented. This allows the logic view to be updated without redrawing the entire view, and without the need to store multiple copies of the program's object model for comparison purposes.

20 Claims, 21 Drawing Sheets

402
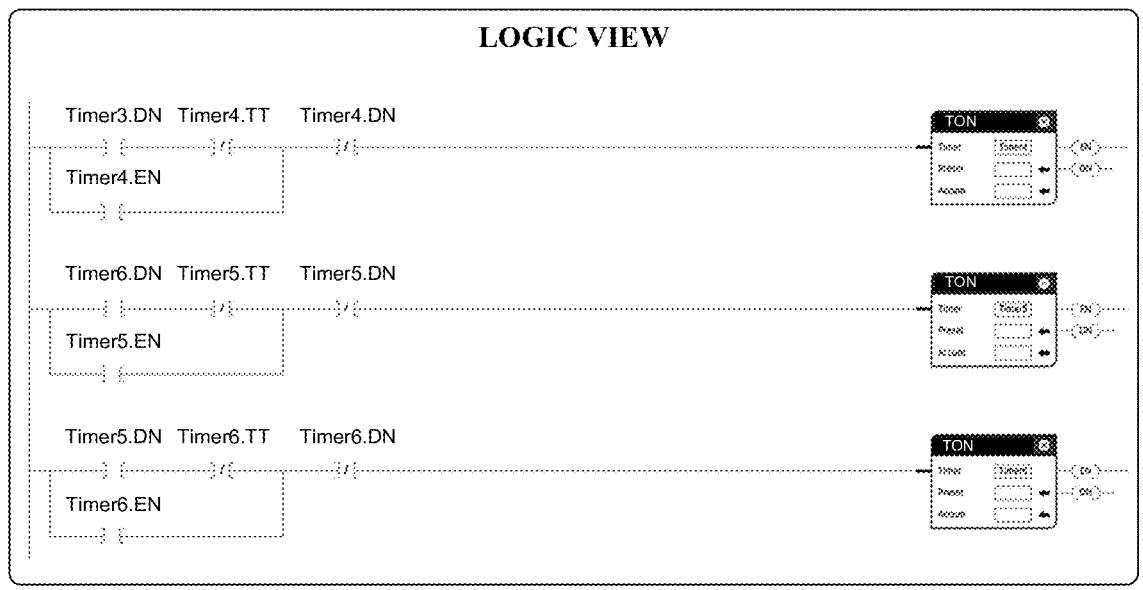
LOGIC VIEW
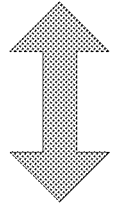
302
TEXT MODEL
[XIC(Timer3.DN) XIO(Timer4).TT) ,XIC(Timer4.EN) ]XIO(Timer4.DN)TON(Timer4,?,?);
[XIC(Timer6.DN) XIO(Timer5).TT) ,XIC(Timer5.EN) ]XIO(Timer5.DN)TON(Timer5,?,?);
[XIC(Timer5.DN) XIO(Timer6).TT) ,XIC(Timer6.EN) ]XIO(Timer6.DN)TON(Timer6,?,?);
[XIC(Timer8.DN) XIO(Timer7).TT) ,XIC(Timer7.EN) ]XIO(Timer7.DN)TON(Timer7,?,?);
[XIC(Timer10.DN) XIO(Timer9).TT) ,XIC(Timer9.EN) ]XIO(Timer9.DN)TON(Timer9,?,?);
FIG. 4

EFFICIENT CLIENT UPDATES USING PATIENCE DIFFERENCE ALGORITHM IN A UNIDIRECTIONAL DATA FLOW ARCHITECTURE FOR INDUSTRIAL AUTOMATION DESIGN

BACKGROUND

The subject matter disclosed herein relates generally to industrial automation systems, and, for example, to industrial programming development platforms.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for is provided, comprising a user interface component configured to display a program development interface on a client device, the program development interface configured to render a logic view of an industrial control program; a project generation component configured to generate a text model of the industrial control program in accordance with programming input submitted via the user interface component; a hashing component configured to generate initial hash data based on content of the text model, and in response to receipt of one or more edits to the industrial control program, generate modified hash data based on updated content of the text model; and a difference detection component configured to identify portions of the industrial control program that have been modified by the one or more edits based on comparative analysis of the initial hash data and the modified hash data, wherein the user interface component is further configured to perform targeted updates to the logic view of the industrial control program, the targeted updates directed to the portions of the industrial control program identified by the difference detection component.

Also, one or more embodiments provide a method, comprising generating, by a system comprising a processor, a text model of an industrial control program; rendering, by the system, a logic view of the industrial control program on a client device via a program development interface; generating, by the system, initial hash data based on content of the text model; and in response to receipt of one or more edits to the industrial control program: generating, by the system, modified hash data based on updated content of the text model; identifying, by the system, portions of the industrial control program that have been modified by the one or more edits based on comparative analysis of the initial hash data and the modified hash data; and performing, by the system, targeted updates to portions of the logic view corresponding to the portions of the industrial control program.

Also, according to one or more embodiments, a non-transitory computer-readable medium is provided having stored thereon instructions that, in response to execution, cause a system comprising a processor to perform operations, the operations comprising generating a text model of an industrial control program; rendering a logic view of the industrial control program on a client device via a program development interface; generating initial hash data based on content of the text model; and in response to receipt of one or more edits to the industrial control program: generating modified hash data based on updated content of the text model; identifying portions of the industrial control program that have been modified by the one or more edits based on comparative analysis of the initial hash data and the modified hash data; and performing targeted updates to portions of the logic view corresponding to the portions of the industrial control program.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 4 is a diagram representing the relationship between a logic view rendered on a routine editor and a text model.

DETAILED DESCRIPTION

Figure 1:
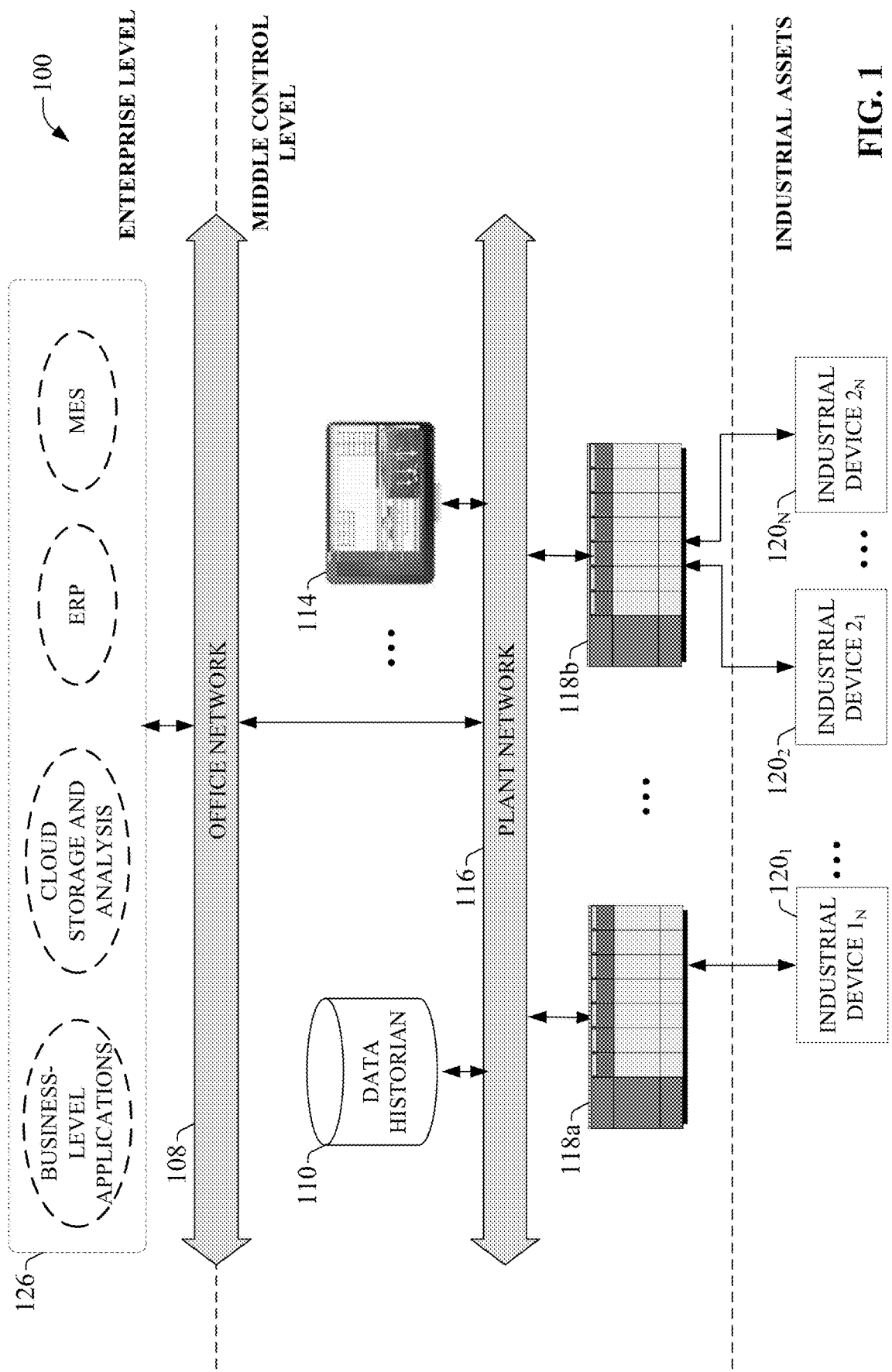
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interface (HMI) terminals 114 that allow plant personnel to view telemetry and status data associated with the automation systems, and to control some aspects of system operation. HMI terminals 114 may communicate with one or more of the industrial controllers 118 over a plant network 116, and exchange data with the industrial controllers to facilitate visualization of information relating to the controlled industrial processes on one or more pre-developed operator interface screens. HMI terminals 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMI terminals 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMI terminals 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a graphical logic editor. Using such development platforms, a designer can write control programming (e.g., ladder logic, structured text, function block diagrams, etc.) for carrying out a desired industrial sequence or process and download the resulting program files to the controller 118.

Figure 2:
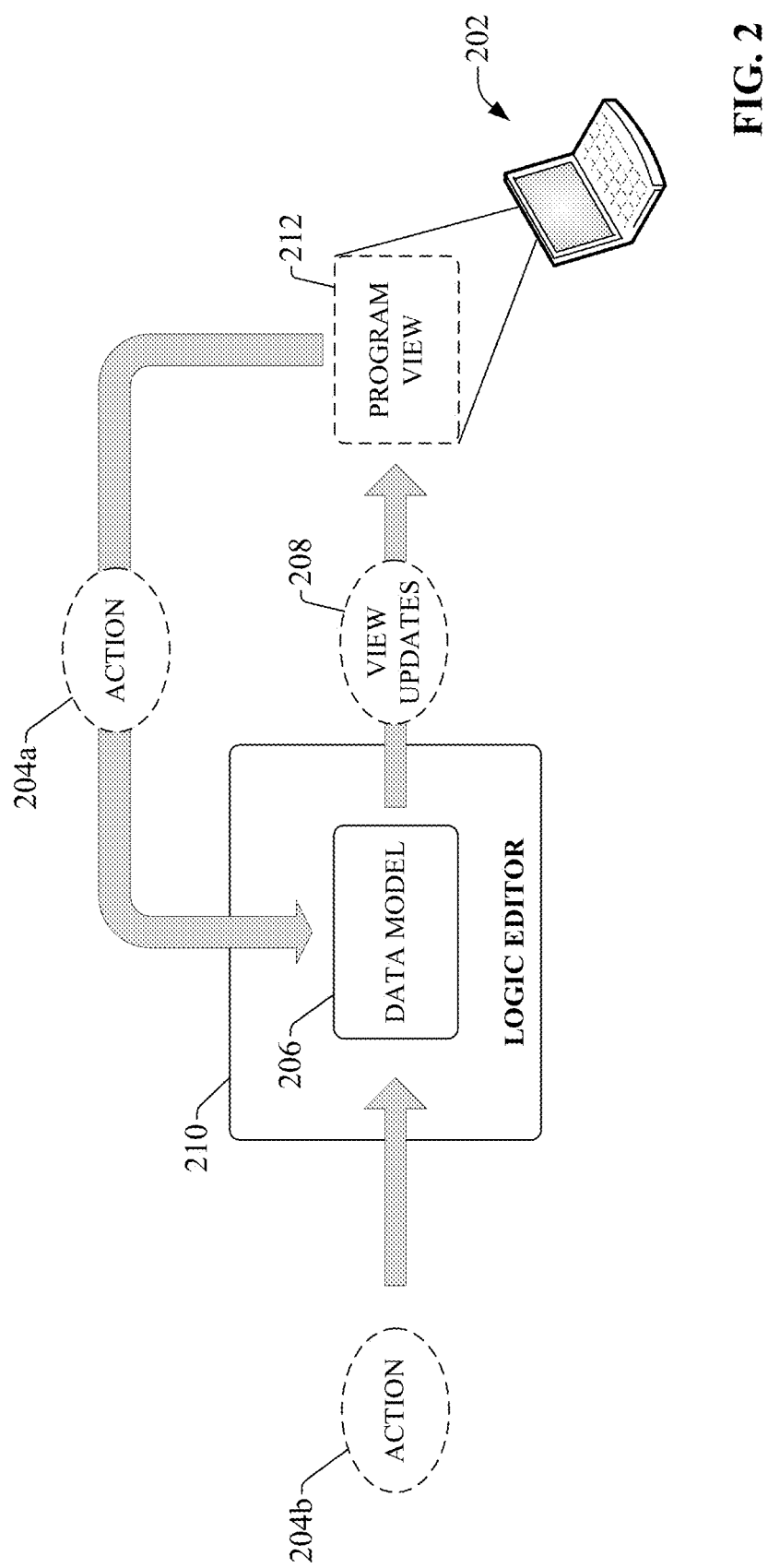
FIG. 2 is a diagram illustrating a generic unidirectional data flow architecture supported by a graphical logic editor.

Graphical logic editors that utilize a unidirectional data flow architecture require pinpointed updates to the view model to operate efficiently. FIG. 2 is a diagram illustrating a generic unidirectional data flow architecture supported by a graphical logic editor. In this example, a client device 202 interfaces with a logic editor 210 to develop industrial controller code in the form of a ladder logic program. The logic editor 210 can be installed directly on the client device 202 or may reside on a server or cloud platform for remote access by the client device 202 (or by multiple client devices in a collaborative development environment). The logic editor 210 renders a development interface on the client device 202 that displays a program view 212 of the program being developed. The user of client device 202 interacts with this program view 212 to view, build, and edit the control program under development.

The program view 212 rendered by the logic editor 210 is updated from a data model 206 of the control program, which is updated as changes are made to the control program. These changes can include, for example, addition or deletion of ladder logic elements (e.g., rungs, instruction blocks, contacts, etc.), changes to I/O or data addresses associated with the ladder logic elements, or other such modifications. When the user of client device 202 submits a change (action 204a) to the control program via interaction with the development interface, the change is submitted to the logic editor 210, which updates the data model 206 to reflect the update to the control program. The program view 212 rendered on the client device 202 is then refreshed based on the updated data model 206. In a collaborative development environment, edits to the control program may also be received at the logic editor 210 from other users (e.g., as action 204b). These edits also result in corresponding updates to the data model 206, which are then reflected in the program view 212 seen by the user of client device 202.

Figure 3:
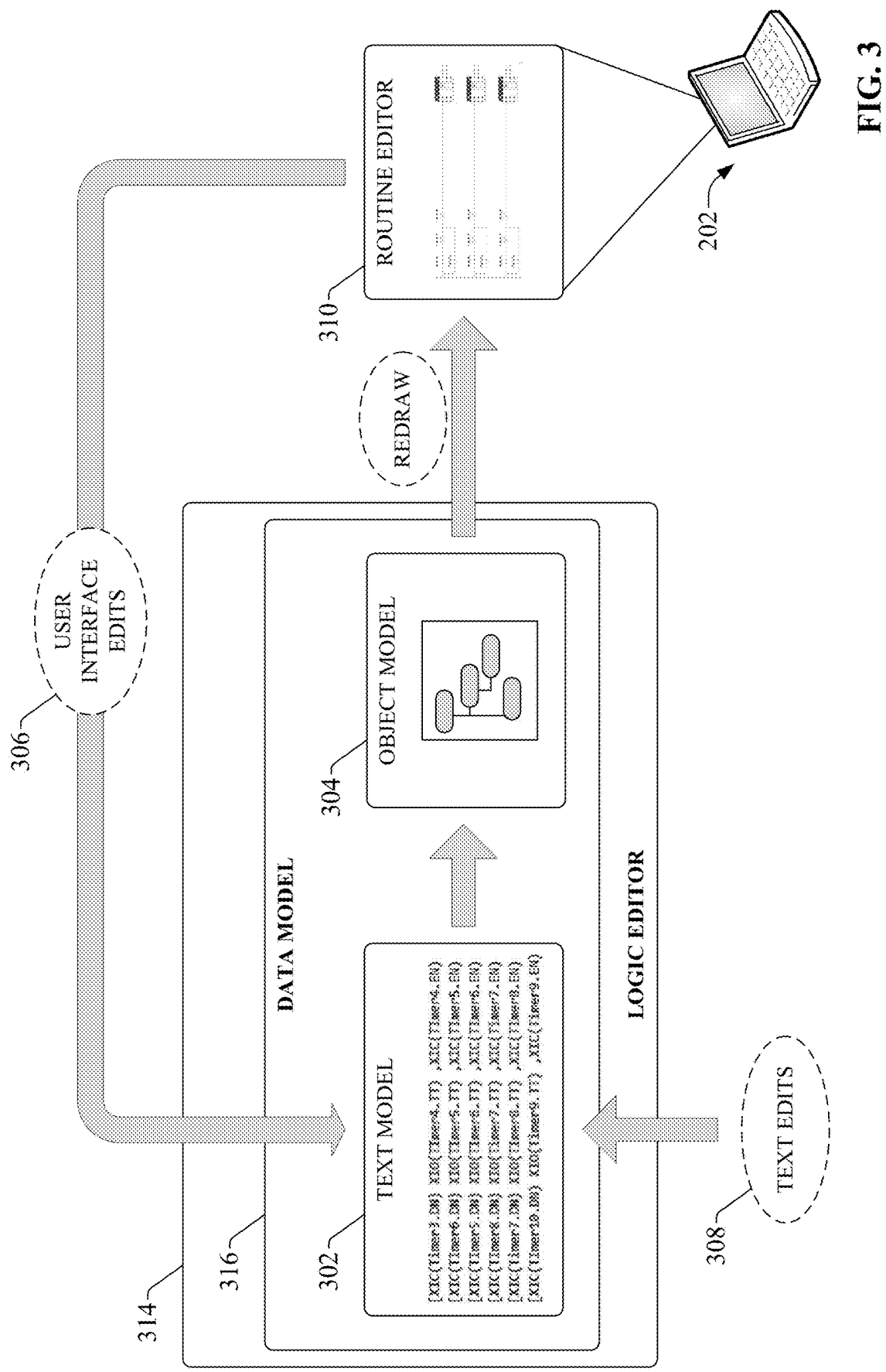
FIG. 3 is a diagram illustrating a unidirectional data flow architecture supported by another graphical logic editor, in which changes to a control program being developed are directed to a text model of the control logic being developed.

To support modern collaborative development tools, such as distributed version control systems, some logic editors can persist industrial control code to user-friendly text files. FIG. 3 is a diagram illustrating a unidirectional data flow architecture supported by another graphical logic editor 314, in which changes to a control program are directed to a text model 302 of the control logic being developed. Similar to the example depicted in FIG. 2, a client device 202 interfaces with a logic editor 314 to develop control logic to be installed and executed on an industrial controller 118. Logic editor 314 renders a routine editor 310 on the client device 202. This routine editor 310 serves as the development environment with which the user creates and edits the control logic, and renders a program view of the control program in ladder logic format. In some embodiments, logic editor 314 can execute on a cloud platform or server and can render the routine editor 310 to client devices 202 via a web browser or thin client.

In this example, the source of truth for the control program being developed—that is, the master file that defines the current state of the program—is a plain text file, or text model 302, that represents the control logic in its current form. FIG. 4 is a diagram representing the relationship between the logic view 402 rendered on the routine editor and the text model 302. The text model 302 comprises lines of text that each correspond to a rung of the ladder logic control program rendered in the logic view 402. Each line of text in the text model 302 specifies, in plain text format, the types of program elements contained in the corresponding rung (e.g., normally open or normally closed contacts, output coils, timers, counters, instruction blocks, etc.), addresses assigned to the program elements (e.g., I/O addresses or internal addresses), values of variables or parameters defined for program elements (e.g., timer preset values, counter preset values, etc.), or other such program elements. In the text model format depicted in FIG. 4, unique text labels are used to identify types of program elements (e.g., XIC, XIO, TON, etc.), and serial or parallel arrangements of program elements are defined using commas, spaces, and brackets. Parameter values and addresses assigned to a given program element are defined within parentheses associated with the element. Information in the text model 302 is translatable to yield the ladder logic format depicted in the logic view 402, and vice versa. It is to be appreciated that the format of text model 302 depicted in FIG. 4 is only intended to be exemplary, and that the techniques described herein for identifying modifications to an industrial control program can also be applied to other text model formats.

Figure 5:
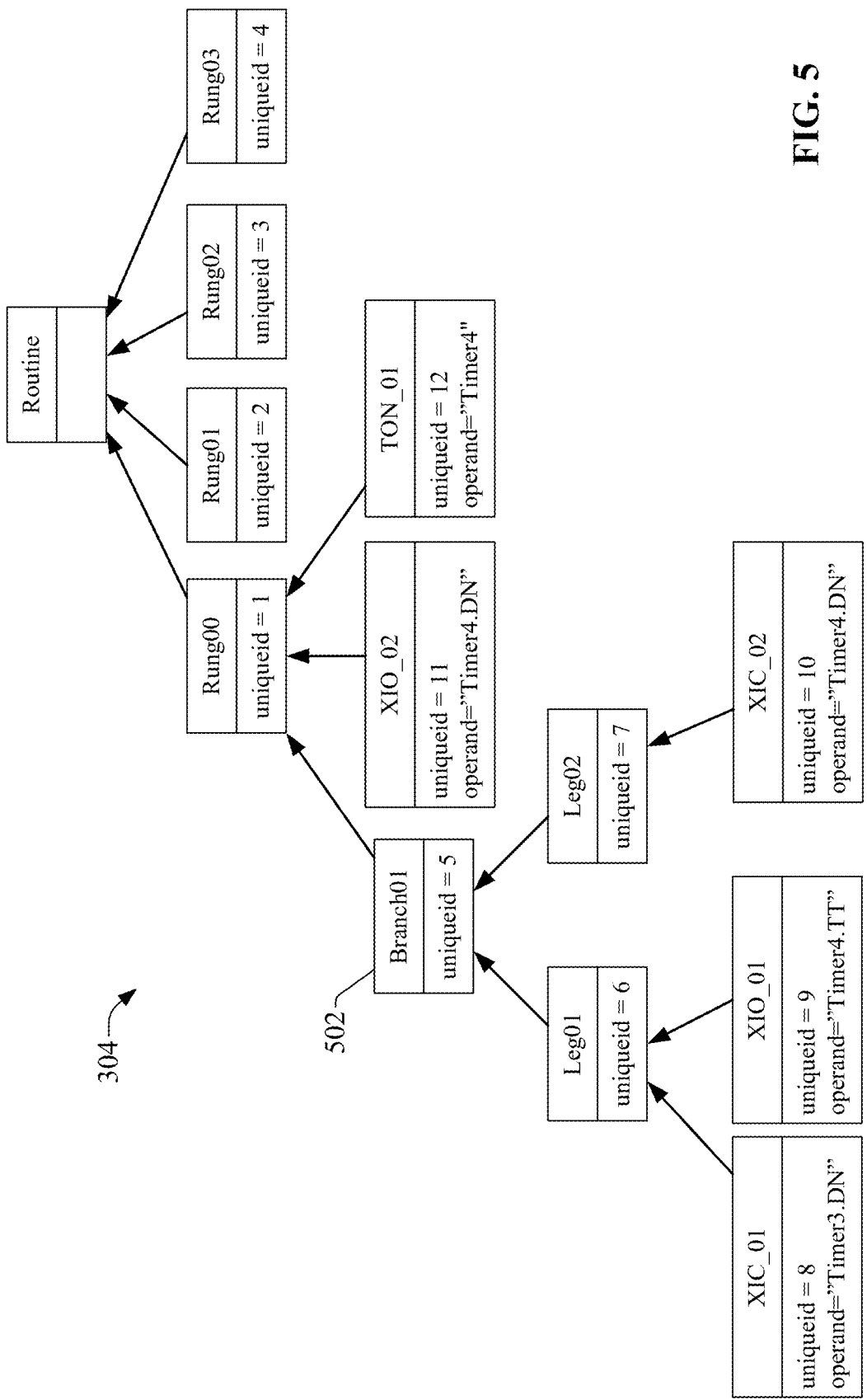
FIG. 5 is an example object model for an industrial control program.

Returning to FIG. 3, the data model 316 for the control program comprises the text model 302 as well as an object model 304 translated from the text model 302. The object model 304 is used by the logic editor 314 to generate the logic view 402 rendered on the routine editor 310. An example partial object model 304 is illustrated in FIG. 5. The object model 304 represents the control program as a hierarchical arrangement of objects 502, with each object 502 representing an element of the ladder logic program (e.g., a rung, a branch, a normally open or normally closed contact, a timer, a counter, etc.). Each object 502 defines a name for its corresponding program element (e.g., Rung00, Branch01, XIO_02) as well as values of any parameters associated with the program element (e.g., a unique identifier number, an operand value, etc.). The object model 304 also defines hierarchical relationships between the objects 502 as dependency connections between the objects 502, reflecting parent-child relationships between the program elements. When a control program is being viewed and edited on a development interface of a routine editor 310, the logic editor 314 translates the object model 304 to a logic view of the program (e.g., in ladder logic format) and renders this view of the program on the routine editor 310.

Returning to FIG. 3, when a user of client device 202 submits an edit 306 to the control program via routine editor 310, the logic editor 314 updates the text model 302 to reflect the modified control program. The object model 304 is also updated based on the text model 302. Since the logic view rendered on the routine editor 310 is driven by the object model 304, the logic editor 314 redraws or refreshes the logic view displayed in the routine editor so that the logic view reflects the updated object model 304.

The text model 302 also offers a user-friendly format for direct edits to the control program via modification of the text file. A user may submit direct text edits 308 to the text model 302 to change portions of the control program. When the text model 302 is updated via a direct text edit 308, the logic editor 314 also updates the object model 304 to reflect the modified text model 302 so that logic views of the updated control program are appropriately rendered in any routine editors 310 that display the program.

Figure 6:
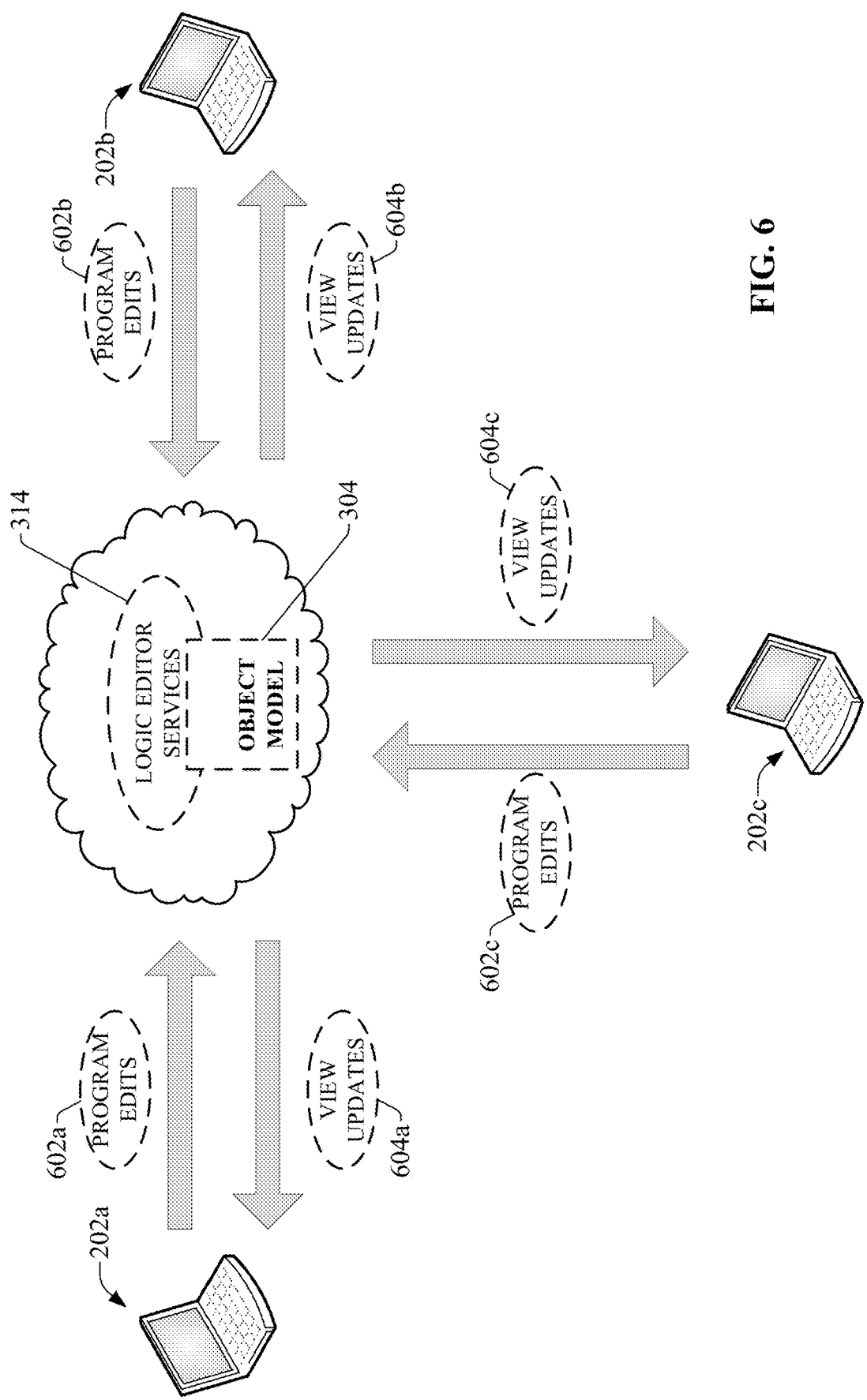
FIG. 6 is a diagram illustrating a collaborative development scenario in which multiple developers view and edit a common control program.

FIG. 6 is a diagram illustrating a collaborative development scenario in which multiple developers view and edit a common control program. In this example, the logic editor 314 executes on a cloud platform or on a server accessible to multiple developers, who submit program edits 602 to the program being developed. These edits 602 can be submitted via interaction with the logic view of the program rendered on the client devices 202 or may be submitted as text edits to the program's corresponding text model 302. In either case, the logic editor 314 incorporates these edits into the control program as they are received and updates the program's object model 304 to reflect these edits 602. The logic editor 314 also sends view updates 604 to the development interfaces on the respective client devices 202 to refresh the logic views rendered on those interfaces in accordance with the updated object model 304.

To minimize the portions of the logic views that must be redrawn by the logic editor 314 when edits are received, as well as to avoid flickering of the logic view due to complete redrawing of the entire logic view, the logic editor 314 should be able to identify the portions of the control program that have been updated and to refresh or redraw only those portions of the logic view. This can reduce the amount of data traffic required to communicate program updates to the client devices 202, as well as the amount of processing required to refresh the logic view in the development interface. However, current approaches to identifying modifications to an industrial control program are limited in their ability to efficiently facilitate updates to the logic view. For example, according to one approach, the logic editor 314 sends the full object model 304, including updates, to the client device 202 so that changes to the object model 304 can be identified locally at the client level. However, this requires the entire object model 304 to be serialized and transmitted from the logic editor 314 (on the cloud platform or server) to the client device 202, which can consume considerable communication bandwidth. Moreover, the client device 202 must deserialize the full object model 304 and calculate changes to the model locally, which consumes a high level of client memory.

According to another approach, the updated object model 304 can be analyzed by the logic editor 314 on the server side to identify changes, and view updates 604 specifying these changes can be sent to the client devices 202. While this approach reduces the amount of data traffic sent to the client devices 202 relative to sending the serialized object model 304, this approach requires two complete copies of the object model 304 to be stored on the server—one reflecting the model 304 prior to receipt of an edit and one reflecting the current version of the model 304 after receipt of the edit—so that the two versions can be compared and differences identified. Moreover, this approach consumes a considerable amount of processing time, which could result in a failure to meet non-functional requirements.

To address these and other issues, one or more embodiments described herein provide an industrial integrated development environment (IDE) system that combines the use of text hashes with a patience difference algorithm to identify changes made to an industrial control program. Hashing of the text model 302 allows a pre-change version of the program to be maintained in memory as a series of hash values, together with a current or updated version of the hashes, without the need to save an entire pre-change copy of the object model 304 or control program. A patience difference algorithm can then be applied to the pre-change and after-change versions of the hashes to identify rungs of the control program that have been modified, added, or deleted, and the identified changes can be communicated to the clients so that the logic view can be updated accordingly.

Figure 7:
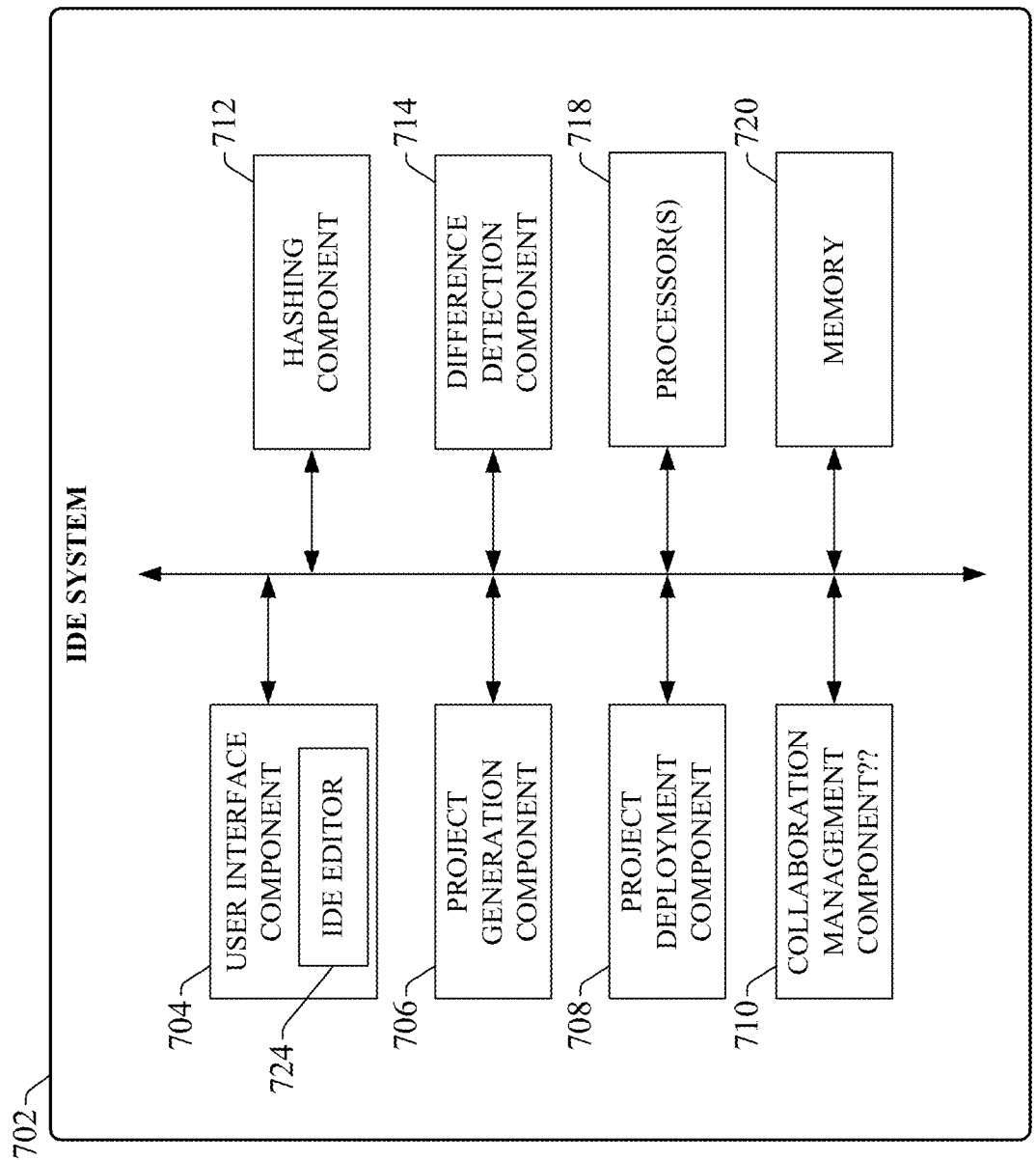
FIG. 7 is a block diagram of an example industrial integrated development environment (IDE) system.

FIG. 7 is a block diagram of an example industrial integrated development environment (IDE) system 702 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 702 can include a user interface component 704 including an IDE editor 724, a project generation component 706, a project deployment component 708, a collaboration management component 710, a hashing component 712, a difference detection component 714, one or more processors 718, and memory 720. In various embodiments, one or more of the user interface component 704, project generation component 706, project deployment component 708, collaboration management component 710, hashing component 712, difference detection component 714, the one or more processors 718, and memory 720 can be electrically and/or communicatively coupled to one another to perform one or more of the functions of the IDE system 702. In some embodiments, components 704, 706, 708, 710, 712, and 714 can comprise software instructions stored on memory 720 and executed by processor(s) 718. IDE system 702 may also interact with other hardware and/or software components not depicted in FIG. 7. For example, processor(s) 718 may interact with one or more external user interface devices, such as a keyboard, a mouse, a display monitor, a touchscreen, or other such interface devices.

User interface component 704 can be configured to receive user input and to render output to the user in any suitable format (e.g., visual, audio, tactile, etc.). In some embodiments, user interface component 704 can be configured to communicatively interface a client device 202 (e.g., a laptop computer, tablet computer, smart phone, etc.) that is communicatively connected to the IDE system 702 (e.g., via a hardwired or wireless connection). The user interface component 704 can then receive user input data and render output data via development interfaces rendered on the client device 202. Input data that can be received via interaction with these development interfaces can include, but is not limited to, control programming input (e.g., ladder logic edits or program text file edits), industrial design specifications or goals, engineering drawings, AR/VR input, domain specific language (DSL) definitions, video or image data, or other such input. Output data rendered by various embodiments of user interface component 704 can include logic views or text views of a control program, programming feedback (e.g., error and highlighting, coding suggestions, etc.), programming development screens, indications of modifications made to the control program, etc.

Project generation component 706 can be configured to create a system project comprising one or more project files based on design input received via the user interface component 704. Project deployment component 708 can be configured to commission the system project created by the project generation component 706 to appropriate industrial devices (e.g., controllers, HMI terminals, motor drives, AR/VR systems, etc.) for execution. To this end, project deployment component 708 can identify the appropriate target devices to which respective portions of the system project should be sent for execution, translate these respective portions to formats understandable by the target devices, and deploy the translated project components to their corresponding devices. Collaboration management component 710 can be configured to manage and regulate design input submitted by multiple developers in a manner that ensures project consistency and coordination between developers.

Hashing component 712 can be configured to translate the text model of an industrial control program to a series of hash values, and to store both current versions and pre-change versions of the hash values for comparison purposes. Difference detection component 714 can be configured to identify differences between the current and pre-change versions of the hash values to identify new, modified, or deleted program segments, and to translate these identified differences into update instructions for updating relevant portions of the logic view of the program.

The one or more processors 718 can perform one or more of the functions described herein with reference to the systems and/or methods disclosed. Memory 720 can be a computer-readable storage medium storing computer-executable instructions and/or information for performing the functions described herein with reference to the systems and/or methods disclosed.

Figure 8:
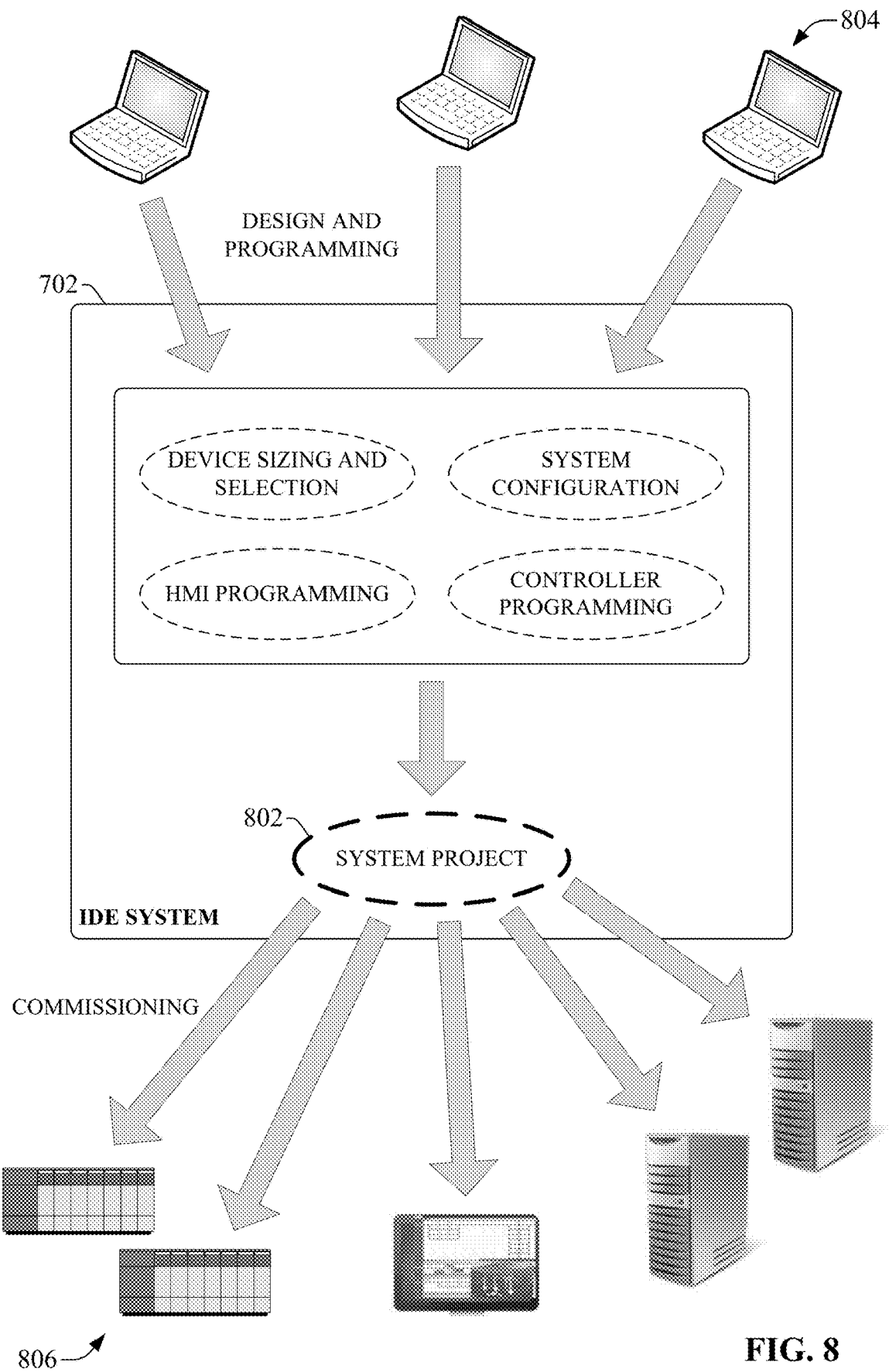
FIG. 8 is a diagram illustrating a generalized architecture of an industrial IDE system.

FIG. 8 is a diagram illustrating a generalized architecture of the industrial IDE system 702 according to one or more example embodiments. While the program differencing techniques of the present disclosure are described in the context of an IDE system 702 having the general features discussed in connection with FIG. 8-10, it is to be appreciated that the program differencing techniques described herein are not limited to use within such IDE systems 702, but rather can be implemented in substantially any type of control program editing system used to develop industrial control programs.

Industrial IDE system 702 can implement a common set of services and workflows spanning not only design, but also commissioning, operation, and maintenance. In terms of design, the IDE system 702 can support not only industrial controller programming and HMI development, but also sizing and selection of system components, device/system configuration, AR/VR visualizations, and other features. The IDE system 702 can also include tools that simplify and automate commissioning of the resulting project and assist with subsequent administration of the deployed system during runtime.

Embodiments of the IDE system 702 that are implemented on a cloud platform also facilitate collaborative project development whereby multiple developers 804 contribute design and programming input to a common automation system project 802 (e.g., an industrial control program). Collaborative tools supported by the IDE system can manage design contributions from the multiple contributors—including edits to a control program—and perform version control of the aggregate system project 802 to ensure project consistency.

Based on design and programming input from one or more developers 804, IDE system 702 generates a system project 802 comprising one or more project files. The system project 802 encodes one or more of control programming (e.g., a control program developed as ladder logic code); HMI, AR, and/or VR visualizations; device or sub-system configuration data (e.g., drive parameters, vision system configurations, telemetry device parameters, safety zone definitions, etc.); or other such aspects of an industrial automation system being designed. IDE system's project deployment component 708 can identify the appropriate target devices 806 on which respective aspects of the system project 802 should be executed (e.g., industrial controllers, HMI terminals, variable frequency drives, safety devices, etc.), translate the system project 802 to executable files that can be executed on the respective target devices, and deploy the executable files to their corresponding target devices 806 for execution, thereby commissioning the system project 802 to the plant floor for implementation of the automation project.

Figure 9:
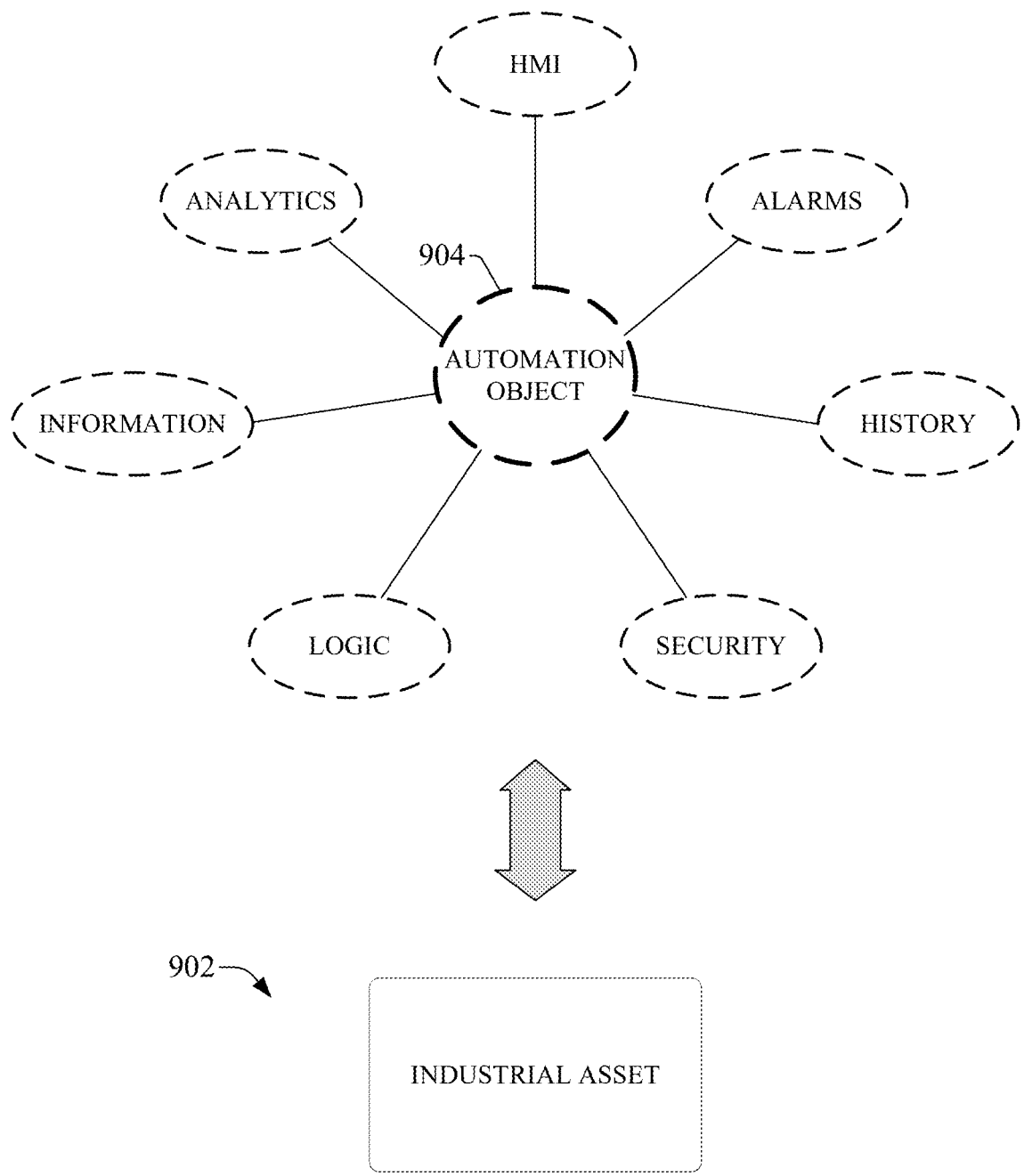
FIG. 9 is a diagram illustrating example automation object properties that can be leveraged by an IDE system in connection with building, deploying, and executing a system project.

To support enhanced development capabilities, some embodiments of IDE system 702 can be built on an object-based data model rather than a tag-based architecture. Automation objects can serve as the building block for this object-based development architecture. FIG. 9 is a diagram illustrating several example automation object properties that can be leveraged by the IDE system 702 in connection with building, deploying, and executing a system project 802. Automation objects 904 can be created and augmented during design, integrated into larger data models, and consumed during runtime. These automation objects 904 provide a common data structure across the IDE system 702 and can be stored in an object library (e.g., part of memory 720) for reuse. The object library can store predefined automation objects 904 representing various classifications of real-world industrial assets 902, including but not limited to pumps, tanks, values, motors, motor drives (e.g., variable frequency drives), industrial robots, actuators (e.g., pneumatic or hydraulic actuators), or other such assets. Automation objects 904 can represent elements at substantially any level of an industrial enterprise, including individual devices, machines made up of many industrial devices and components (some of which may be associated with their own automation objects 904), and entire production lines or process control systems.

An automation object 904 for a given type of industrial asset can encode such aspects as 2D or 3D visualizations, alarms, control code (e.g., logic or other type of control programming), analytics, startup procedures, testing protocols, validation reports, simulations, schematics, security protocols, and other such properties associated with the industrial asset 902 represented by the object 904. Automation objects 904 can also be geotagged with location information identifying the location of the associated asset. During runtime of the system project 802, the automation object 904 corresponding to a given real-world asset 902 can also record status or operational history data for the asset. In general, automation objects 904 serve as programmatic representations of their corresponding industrial assets 902 and can be incorporated into a system project 802 as elements of control code, a 2D or 3D visualization, a knowledgebase or maintenance guidance system for the industrial assets, or other such aspects.

Figure 10:
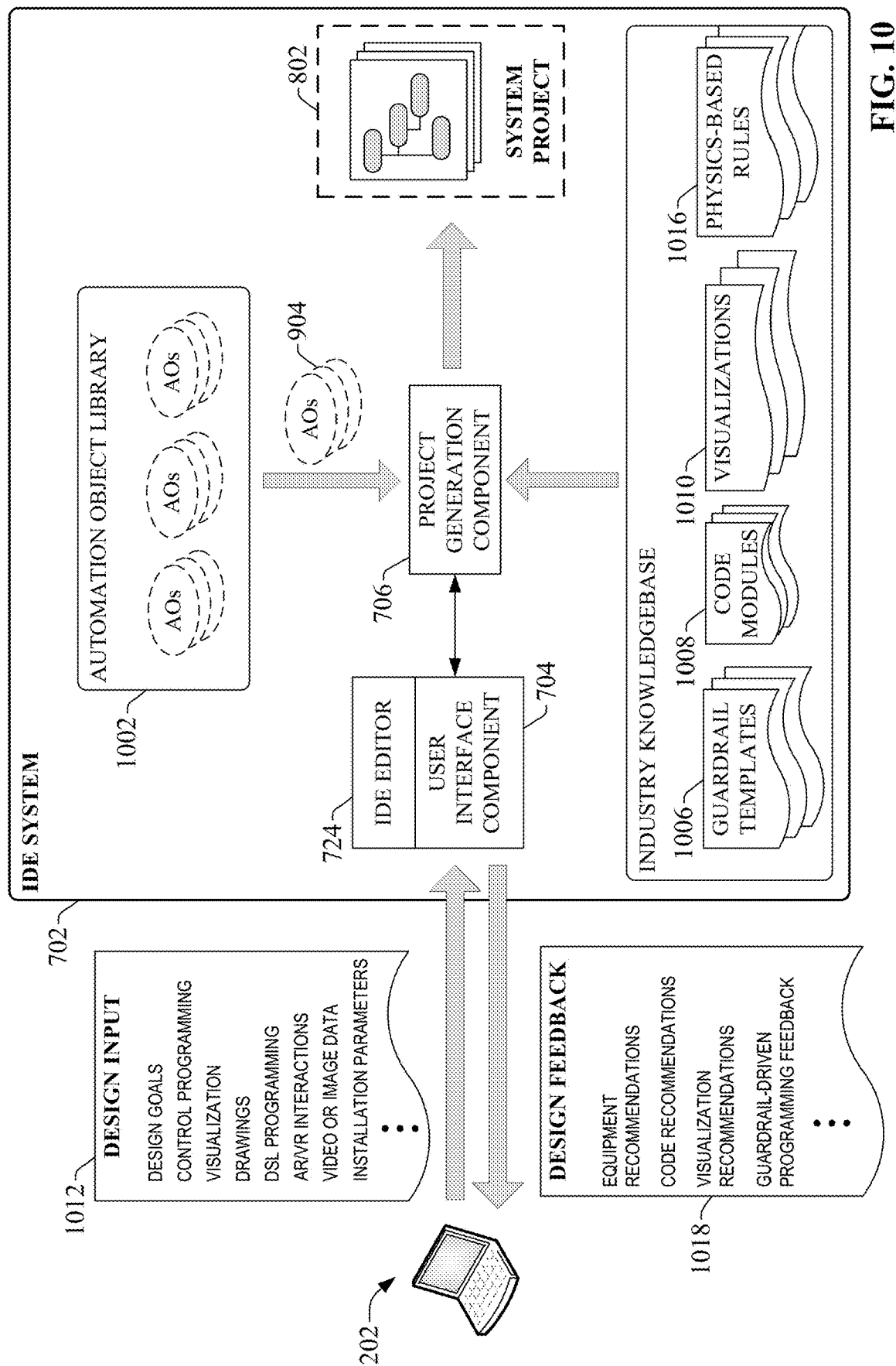
FIG. 10 is a diagram illustrating example data flows associated with creation of a system project for an automation system being designed using an IDE system.

FIG. 10 is a diagram illustrating example data flows associated with creation of a system project 802 for an automation system being designed using IDE system 702 according to one or more embodiments. A client device 202 (e.g., a laptop computer, tablet computer, desktop computer, mobile device, wearable AR/VR appliance, etc.) can access the IDE system's project development tools and leverage these tools to create a comprehensive system project 802 for an automation system being developed. Through interaction with the system's user interface component 704, developers can submit design input 1012 to the IDE system 702 in various supported formats, including industry-specific control programming (e.g., control logic, structured text, sequential function charts, etc.) and HMI screen configuration input. Based on this design input 1012 and information stored in an industry knowledgebase (predefined code modules 1008 and visualizations 1010, guardrail templates 1006, physics-based rules 1016, etc.), user interface component 704 renders design feedback 1018 designed to assist the developer in connection with developing a system project 802 for configuration, control, and visualization of an industrial automation system.

In addition to control programming and visualization definitions, some embodiments of IDE system 702 can be configured to receive digital engineering drawings (e.g., computer-aided design (CAD) files) as design input 1012. In such embodiments, project generation component 706 can generate portions of the system project 802—e.g., by automatically generating control and/or visualization code—based on analysis of existing design drawings. Drawings that can be submitted as design input 1012 can include, but are not limited to, P&ID drawings, mechanical drawings, flow diagrams, or other such documents. For example, a P&ID drawing can be imported into the IDE system 702, and project generation component 706 can identify elements (e.g., tanks, pumps, etc.) and relationships therebetween conveyed by the drawings. Project generation component 706 can associate or map elements identified in the drawings with appropriate automation objects 904 corresponding to these elements (e.g., tanks, pumps, etc.) and add these automation objects 904 to the system project 802. The device-specific and asset-specific automation objects 904 include suitable code and visualizations to be associated with the elements identified in the drawings. In general, the IDE system 702 can examine one or more different types of drawings (mechanical, electrical, piping, etc.) to determine relationships between devices, machines, and/or assets (including identifying common elements across different drawings) and intelligently associate these elements with appropriate automation objects 904, code modules 1008, and/or visualizations 1010. The IDE system 702 can leverage physics-based rules 1016 as well as pre-defined code modules 1008 and visualizations 1010 as necessary in connection with generating code or project data for system project 802.

The IDE system 702 can also determine whether pre-defined visualization content is available for any of the objects discovered in the drawings and generate appropriate HMI screens or AR/VR content for the discovered objects based on these pre-defined visualizations. To this end, the IDE system 702 can store industry-specific, asset-specific, and/or application-specific visualizations 1010 that can be accessed by the project generation component 706 as needed. These visualizations 1010 can be classified according to industry or industrial vertical (e.g., automotive, food and drug, oil and gas, pharmaceutical, etc.), type of industrial asset (e.g., a type of machine or industrial device), a type of industrial application (e.g., batch processing, flow control, web tension control, sheet metal stamping, water treatment, etc.), or other such categories. Predefined visualizations 1010 can comprise visualizations in a variety of formats, including but not limited to HMI screens or windows, mashups that aggregate data from multiple pre-specified sources, AR overlays, VR objects representing 3D virtualizations of the associated industrial asset, or other such visualization formats. IDE system 702 can select a suitable visualization for a given object based on a pre-defined association between the object type and the visualization content.

In another example, the project generation component 706 can learn permissives and interlocks (e.g., valves and their associated states) that serve as necessary preconditions for starting a machine based on analysis of the user's CAD drawings. Project generation component 706 can generate any suitable code (ladder logic, function blocks, etc.), device configurations, and visualizations based on analysis of these drawings and markings for incorporation into system project 802. In some embodiments, user interface component 704 can include design tools for developing engineering drawings within the IDE platform itself, and the project generation component 706 can generate this code as a background process as the user is creating the drawings for a new project. In some embodiments, project generation component 706 can also translate state machine drawings to a corresponding programming sequence, yielding at least skeletal code that can be enhanced by the developer with additional programming details as needed.

Also, or in addition, some embodiments of IDE system 702 can support goal-based automated programming. For example, the user interface component 704 can allow the user to specify production goals for an automation system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 706 will generate portions of the system project 802 to satisfy the specified design goals and constraints. Portions of the system project 802 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control coding, or HMI screens suitable for visualizing the automation system being designed.

Some embodiments of the project generation component 706 can also generate at least some of the project code for system project 802 based on knowledge of parts that have been ordered for the project being developed. This can involve accessing the customer's account information maintained by an equipment vendor to identify devices that have been purchased for the project. Based on this information the project generation component 706 can add appropriate automation objects 904 and associated code modules 1008 corresponding to the purchased assets, thereby providing a starting point for project development.

Some embodiments of project generation component 706 can also monitor customer-specific design approaches for commonly programmed functions (e.g., pumping applications, batch processes, palletizing operations, etc.) and generate recommendations for design modules (e.g., code modules 1008, visualizations 1010, etc.) that the user may wish to incorporate into a current design project based on an inference of the designer's goals and learned approaches to achieving the goal. To this end, some embodiments of project generation component 706 can be configured to monitor design input 1012 over time and, based on this monitoring, learn correlations between certain design actions (e.g., addition of certain code modules or snippets to design projects, selection of certain visualizations, etc.) and types of industrial assets, industrial sequences, or industrial processes being designed. Project generation component 706 can record these learned correlations and generate recommendations during subsequent project development sessions based on these correlations. For example, if project generation component 706 determines, based on analysis of design input 1012, that a designer is currently developing a control project involving a type of industrial equipment that has been programmed and/or visualized in the past in a repeated, predictable manner, the project generation component 706 can instruct user interface component 704 to render recommended development steps or code modules 1008 the designer may wish to incorporate into the system project 802 based on how this equipment was configured and/or programmed in the past.

In some embodiments, IDE system 702 can also store and implement guardrail templates 1006 that define design guardrails intended to ensure the project's compliance with internal or external design standards. Based on design parameters defined by one or more selected guardrail templates 1006, user interface component 704 can provide, as a subset of design feedback 1018, dynamic recommendations or other types of feedback designed to guide the developer in a manner that ensures compliance of the system project 802 with internal or external requirements or standards (e.g., certifications such as TUV certification, in-house design standards, industry-specific or vertical-specific design standards, etc.). This feedback 1018 can take the form of text-based recommendations (e.g., recommendations to rewrite an indicated portion of control code to comply with a defined programming standard), syntax highlighting, error highlighting, auto-completion of code snippets, or other such formats. In this way, IDE system 702 can customize design feedback 1018—including programming recommendations, recommendations of predefined code modules 1008 or visualizations 1010, error and syntax highlighting, etc.—in accordance with the type of industrial system being developed and any applicable in-house design standards.

Guardrail templates 1006 can also be designed to maintain compliance with global best practices applicable to control programming or other aspects of project development. For example, user interface component 704 may generate and render an alert if a developer's control programing is deemed to be too complex as defined by criteria specified by one or more guardrail templates 1006. Since different verticals (e.g., automotive, pharmaceutical, oil and gas, food and drug, marine, etc.) must adhere to different standards and certifications, the IDE system 702 can maintain a library of guardrail templates 1006 for different internal and external standards and certifications, including customized user-specific guardrail templates 1006. These guardrail templates 1006 can be classified according to industrial vertical, type of industrial application, plant facility (in the case of custom in-house guardrail templates 1006) or other such categories. During development, project generation component 706 can select and apply a subset of guardrail templates 1006 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 706 can leverage guardrail templates 1006 to implement rules-based programming, whereby programming feedback (a subset of design feedback 1018) such as dynamic intelligent autocorrection, type-aheads, or coding suggestions are rendered based on encoded industry expertise and best practices (e.g., identifying inefficiencies in code being developed and recommending appropriate corrections).

Users can also run their own internal guardrail templates 1006 against code provided by outside vendors (e.g., OEMs) to ensure that this code complies with in-house programming standards. In such scenarios, vendor-provided code can be submitted to the IDE system 702, and project generation component 706 can analyze this code in view of in-house coding standards specified by one or more custom guardrail templates 1006. Based on results of this analysis, user interface component 704 can indicate portions of the vendor-provided code (e.g., using highlights, overlaid text, etc.) that do not conform to the programming standards set forth by the guardrail templates 1006, and display suggestions for modifying the code in order to bring the code into compliance. As an alternative or in addition to recommending these modifications, some embodiments of project generation component 706 can be configured to automatically modify the code in accordance with the recommendations to bring the code into conformance.

In making coding suggestions as part of design feedback 1018, project generation component 706 can invoke selected code modules 1008 stored in a code module database (e.g., on memory 720). These code modules 1008 comprise standardized coding segments for controlling common industrial tasks or applications (e.g., palletizing, flow control, web tension control, pick-and-place applications, conveyor control, etc.). In some embodiments, code modules 1008 can be categorized according to one or more of an industrial vertical (e.g., automotive, food and drug, oil and gas, textiles, marine, pharmaceutical, etc.), an industrial application, or a type of machine or device to which the code module 1008 is applicable. In some embodiments, project generation component 706 can infer a programmer's current programming task or design goal based on programmatic input being provided by a the programmer (as a subset of design input 1012), and determine, based on this task or goal, whether one of the pre-defined code modules 1008 may be appropriately added to the control program being developed to achieve the inferred task or goal. For example, project generation component 706 may infer, based on analysis of design input 1012, that the programmer is currently developing control code for transferring material from a first tank to another tank, and in response, recommend inclusion of a predefined code module 1008 comprising standardized or frequently utilized code for controlling the valves, pumps, or other assets necessary to achieve the material transfer.

Figure 11:
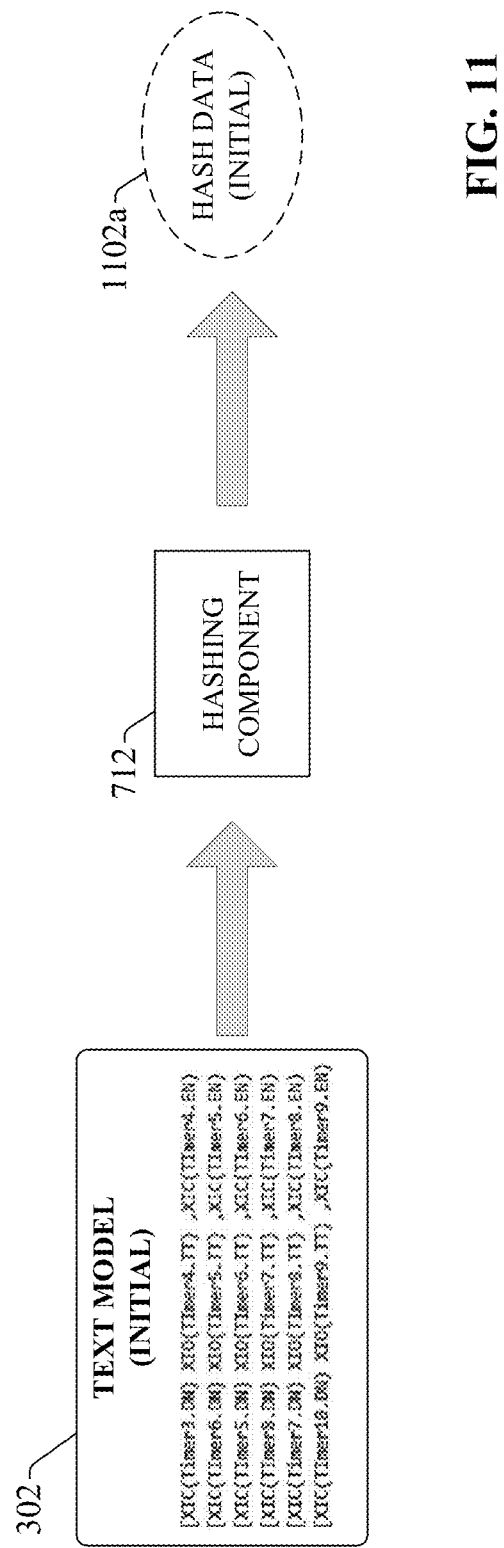
FIG. 11 is a diagram illustrating generation of initial hash data by an IDE system's hashing component.

As noted above, embodiments of the industrial IDE system 702 can combine the use of text model hashing with application of a patience difference algorithm to identify elements or portions of an industrial control program that have been modified. This allows the system's user interface component 704 to update these portions the logic views rendered on client devices 202 without the need to redraw the entire logic view. FIG. 11 is a diagram illustrating generation of initial hash data 1102a by the IDE system's hashing component 712. In this example, it is assumed that the IDE system 702 is being used to develop an industrial control program by one or more developers. A text model 302 reflecting the current (or initial) state of the control program is maintained by the system 704, as described above in connection with FIG. 3. Hashing component 712 applies a hashing algorithm to multiple levels of the text model 302 to obtain initial hash data 1102a comprising a unique series of hash values that uniquely reflect the state of the text model 302, and by extension the control program. The hashing component 712 can apply any suitable hashing algorithm capable of converting program elements and their associated parameters and variables to respective fixed-length numerical values or alphanumeric strings to obtain the hash data 1102a.

Figure 12:
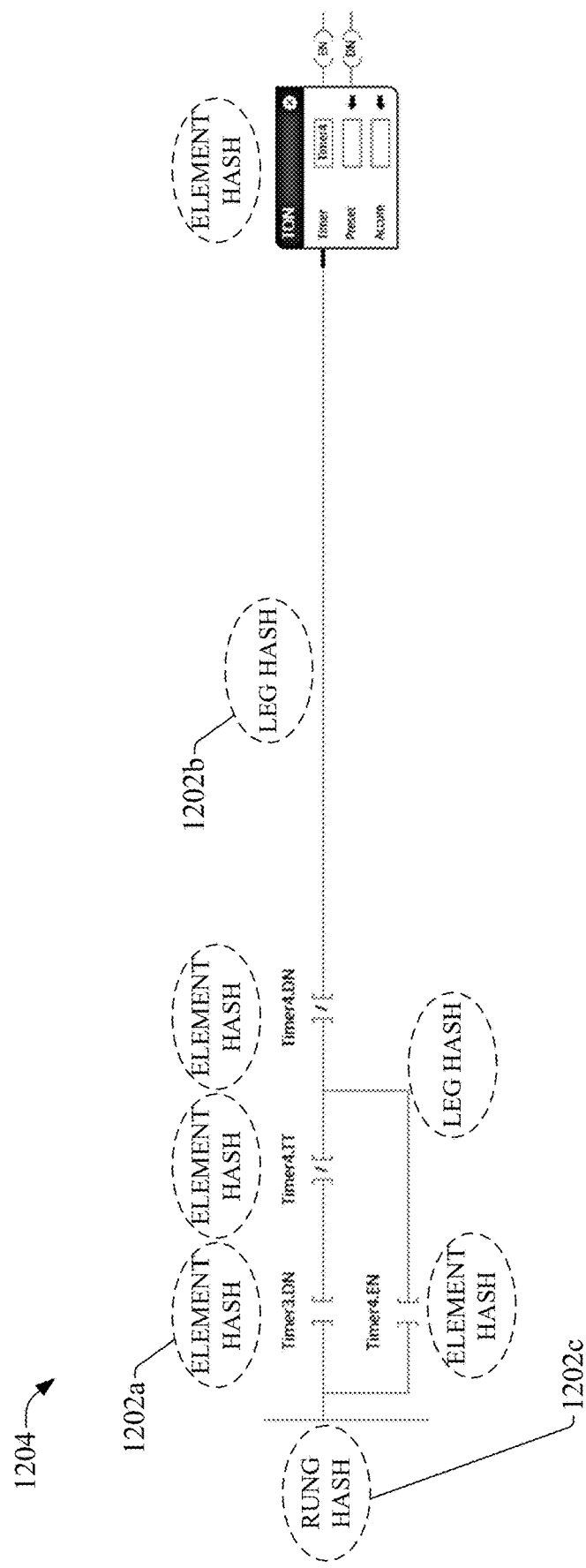
FIG. 12 is a rung of an example control program that has been labeled to identify program aspects for which hash values can be generated by a hashing component.

In order to accurately identify changes to any aspect or level of the control program, the hashing component 712 can generate a highly granular set of hash values for multiple levels of the program. FIG. 12 is a rung 1204 of an example control program that has been labeled to identify program aspects for which hash values can be generated by the hashing component 712. A given control logic rung 1204 can comprise any number of legs or branches, each having one or more associated elements (e.g., normally open or normally closed contacts, output coils, timers, counters, function blocks, instruction blocks, etc.). These elements represent conditions for rendering the leg true or an output to be triggered when a path to the output becomes true. A program element may have one or more associated parameters or variables, depending on the type of program element. For example, a normally open or normally closed contact may have an associated address (e.g., Timer3.DN) that controls the state of the contact. Similarly, a timer (e.g., a TON instruction) may have parameters defining the name of the timer (e.g., Timer4) and a preset value specifying an accumulated value of the timer that will trigger the timer's DONE state.

In an example embodiment, hashing component 712 can generate hash values for each of these different program components found within the control program. In the example depicted in FIG. 12, the hashing component 712 has generated element hashes 1202a for each program element in the rung 1204, leg hashes 1202b for each leg or branch defined on the rung 1204 (which may be based on an aggregation of element-level hashes for elements found on the rung), and a rung hash 1202c for the rung 1204 as a whole. In the examples described herein, the rung hash 1202c comprises an aggregate hash value for the rung 1204 that is based on an aggregation of the element hashes 1202a and/or leg hashes 1202b for the rung 1204, and the resulting hash data 1102a comprises a series of these rung hashes 1202c generated for the rungs that make up the control program. In this way, program edits can be identified at the rung level, as will be described in more detail herein.

Figure 13:
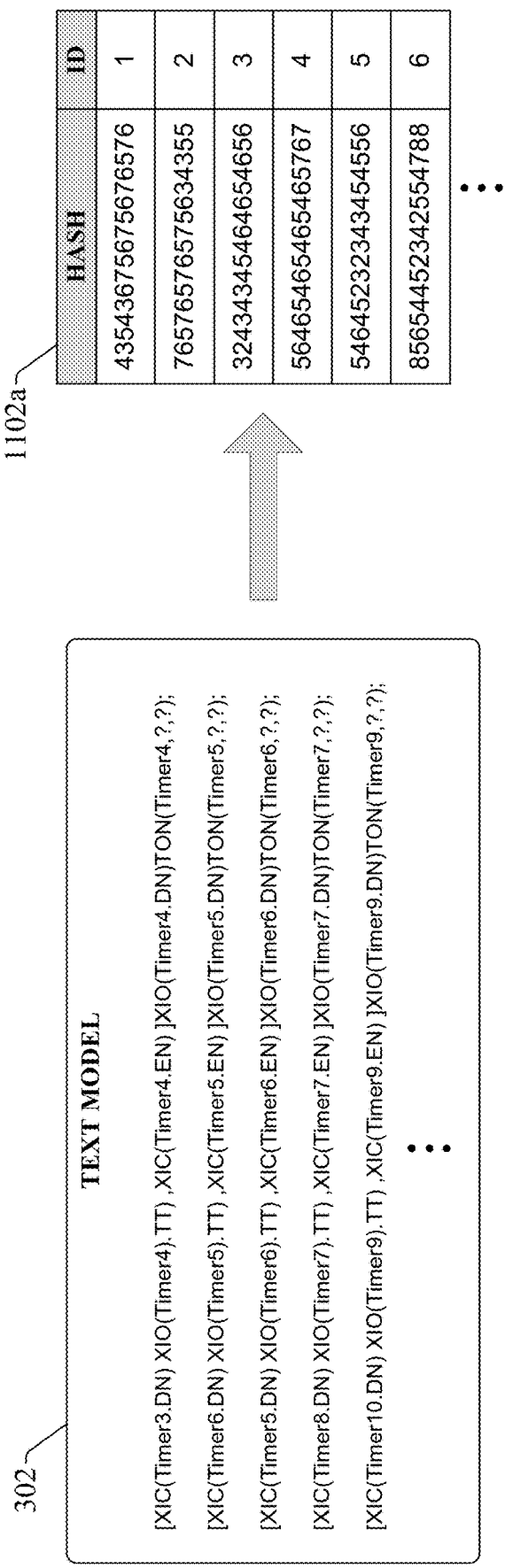
FIG. 13 is a diagram illustrating a portion of an example text model for a control program and a corresponding portion of hash data generated for the text model.

FIG. 13 is a diagram illustrating a portion of an example text model 302 for a control program and a corresponding portion of the hash data 1102a generated for the text model 302 by the hashing component 712. In this example, each line of text in the text model 302 corresponds to a rung of the control program, and specifies the branches present in the rung, the elements associated with each branch, and any parameter values associated with the elements (e.g., addresses, names, etc.). The corresponding hash data 1102a includes a series of fixed-length numerical hash values that each correspond to one of the rungs (or lines of text in the text model 302). Each hash value is also assigned an identification (ID) number so that the hash value can be uniquely identified.

Figure 14:
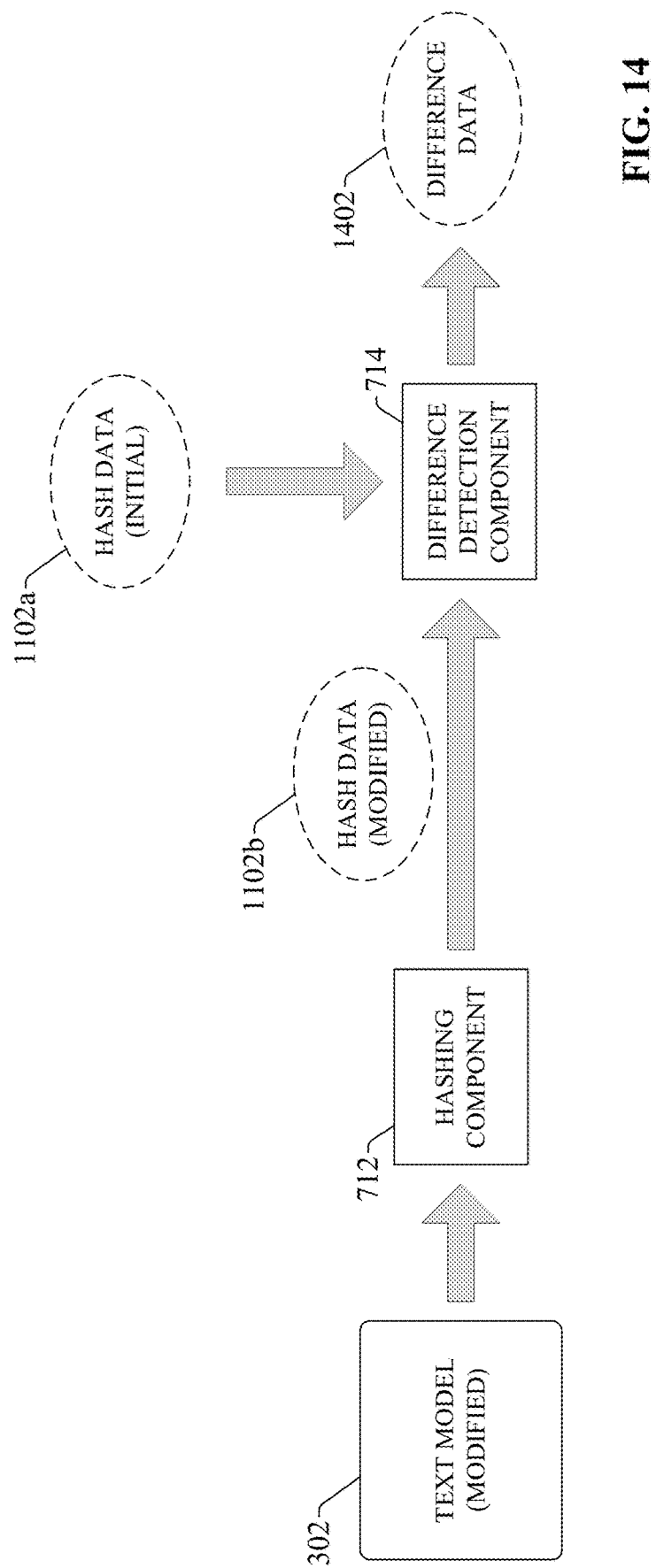
FIG. 14 is a diagram illustrating hashing of a modified text model and difference detection processing.

The hashing component 712 stores the initial hash data 1102a on storage associated with the IDE system 702 (e.g., memory 720 or cloud-based memory). At the time of creation, this initial hash data 1102a represents a current state of the control program prior to subsequent edits. During development, the IDE system 702 receives edits to the program, either from a single developer or from multiple developers in a collaborative editing environment. When a new set of edits are submitted to the IDE system 702, the text model 302 is updated to reflect the edits, as discussed above. FIG. 14 is a diagram illustrating hashing of the modified text model 302 and difference detection processing. After edits to the program have been received and the text model 302 has been updated accordingly, the hashing component 712 applies its hashing algorithm to the resulting modified text model 302 to obtain modified hash data 1102b reflecting the new current state of the text model 302 (and by extension the control program). To identify the portions of the control program that have been modified so that pinpointed logic view updates (e.g., updates 604 in FIG. 6) can be sent to any client devices 202 that are currently viewing the control program, the system's difference detection component 714 can compare the previously generated initial hash data 1102a—which reflects the state of the control program prior to the edits—with the modified hash data 1102 representing the current, post-edit state of the program. In particular, the difference detection component 714 can apply a patience difference algorithm to the initial and modified sets of hash data 1102 to identify rungs that have been modified or new rungs that have been added by the edits.

Figure 15:
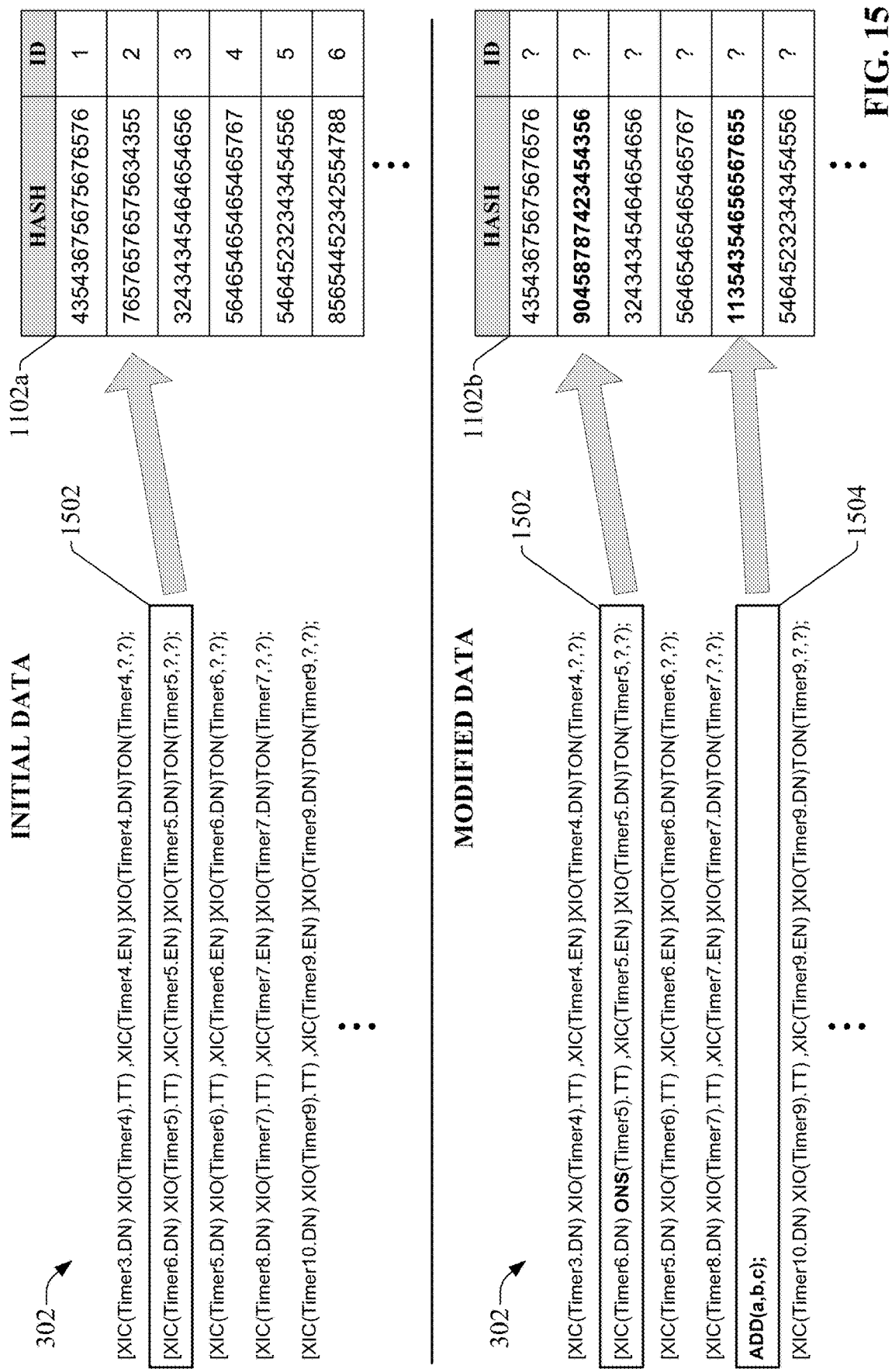
FIG. 15 is an illustration of an initial version of a text model together with its corresponding initial hash data, as well as a modified version of the text model together with its corresponding modified hash data.

FIG. 15 depicts an initial version of text model 302 together with its corresponding initial hash data 1102a, as well as a modified version of the text model 302 together with its corresponding modified hash data 1102b for an example editing scenario. In this example, the second line 1502 of the initial version of text model 302 (representing a particular rung of the control program) corresponds to the second hash value (hash ID=2). The initial version of the control program has been edited to modify the rung corresponding to line 1502 of the text model 302 (changing an examine-if-open (XIO) element to a one-shot (ONS) element), as well as to add a new rung represented by new line 1504 of the text model 302. This new rung has been inserted between two existing rungs within the program. After the text model 302 has been updated to reflect these modifications, hashing component 712 generates modified hash data 1102b based on the modified text file. In the resulting modified hash data 1102b, the hash value corresponding to modified line 1502 (the second value from the top of the hash values) has been changed relative to its initial value based on the modification, and a new hash value corresponding to the newly added line 1504 has been inserted between the two hash values representing the rungs above and below the new rung. The modified hash value and the new hash value are depicted in bold in FIG. 15.

When comparing the modified hash data 1102b with the initial hash data 1102a for the purpose of identifying whether any rungs have been modified or added, the correspondence between each hash value in the initial hash data 1102a and its corresponding hash value in the modified hash data 1102b is initially unknown. This is because the number of hash values contained in the modified hash data 1102b may not match the number of hash values contained in the initial hash data 1102a if rungs have been added or removed. Consequently, the ID numbers assigned to the hash values in the modified hash data 1102—which should be set to match the ID numbers of their corresponding initial values—are initially unknown. In order to identify rungs that have been modified, added, or removed, the difference detection component 714 first applies a patience difference algorithm to the initial and modified hash data 1102 to identify correspondences between hash values of the modified hash data 1102b and those of the initial hash data 1102a. Then, based on these learned correspondences, the difference detection component 714 identifies hash values that have been changed, added or removed as a result of the program modification.

Figure 16:
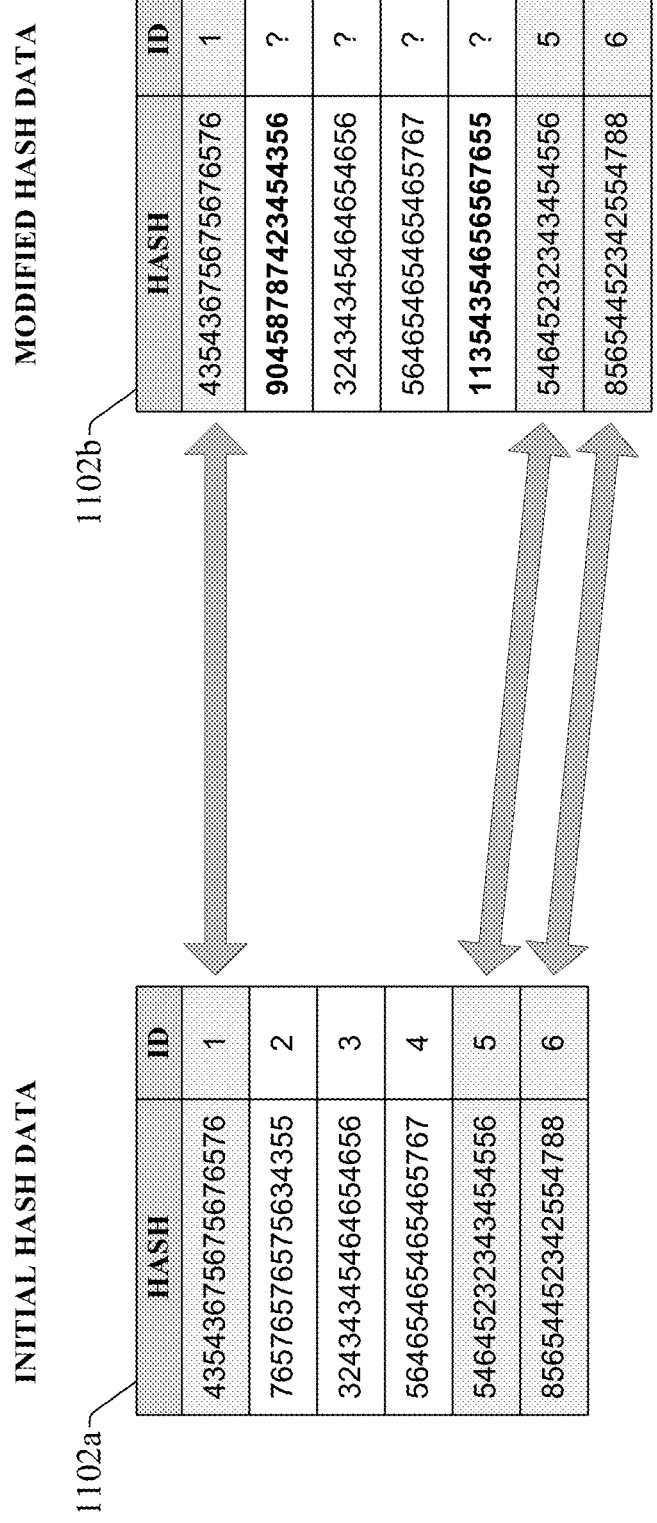
FIG. 16 is an illustration of a first phase of difference detection processing in which an initial comparison is performed between initial hash data and modified hash data.

FIG. 16 illustrates a first phase of the difference detection processing in which the difference detection component 714 performs an initial comparison between the initial hash data 1102a and the modified hash data 1102b. In order to learn correspondences between the initial hash data 1102a and the modified hash data 1102, the difference detection component 714 first begins comparing corresponding hash values at the beginning and end of the respective sets of hash data 1102 and assigns ID numbers to hash values of the modified hash data 1102b that are found to match their corresponding values of the initial hash data 1102a. That is, the difference detection component 714 compares the first hash value of the modified hash data 1102b with the first hash value of the initial hash data 1102a (the value labeled ID 1). If these hash values are identical, as in the scenario depicted in FIG. 16, the difference detection component 714 concludes that the modified hash value corresponds to the initial hash value, and therefore assigns the ID number of the initial hash value (ID=1) to the modified hash value, thus marking the correspondence between the two values. The difference detection component 714 performs this comparison sequentially for consecutive hash values—in order from the top of the list of hash values—until a mismatch is discovered. In the example depicted in FIG. 16, the second pair of hash values—the value labeled ID 2 of the initial hash data 1102a and the second hash value of the modified hash data 1102b—are found to be mismatched. The second hash value of the modified hash data 1102b (depicted in bold in FIG. 16) is therefore not yet assigned an ID number since its correspondence with the initial hash data 1102a is not yet confirmed.

The difference detection component 714 performs similar hash value comparisons starting at the ends of the sets of hash values, moving upward through the lists of values. In the example depicted in FIG. 16 it is assumed that the hash value labeled ID 6 is the last value in the initial hash data 1102a. This last hash value is compared with the last hash value of the modified hash data 1102b. Since these values match, the difference detection component 714 assigns an ID number of 6 to the modified hash data 1102, thus marking the correspondence between the two compared values. The difference detection component 714 sequences this comparison upward through the sets of hash data 1102 until a pair of mismatched hash values are found. In the example depicted in FIG. 16, the hash value that is second from the bottom of the initial hash data 1102a (ID=5) matches the hash value that is second from the bottom of the modified hash data 1102b, and so the second to last value in the modified hash data 1102b is assigned an ID number of 5 to match its corresponding initial value in the initial hash data 1102a. The values that are third from the bottom of the respective sets of hash data 1102 are found to be mismatched, and so the value of the modified hash data 1102b that is third from the bottom (bolded in FIG. 16) is not yet assigned an ID number.

Figure 17:
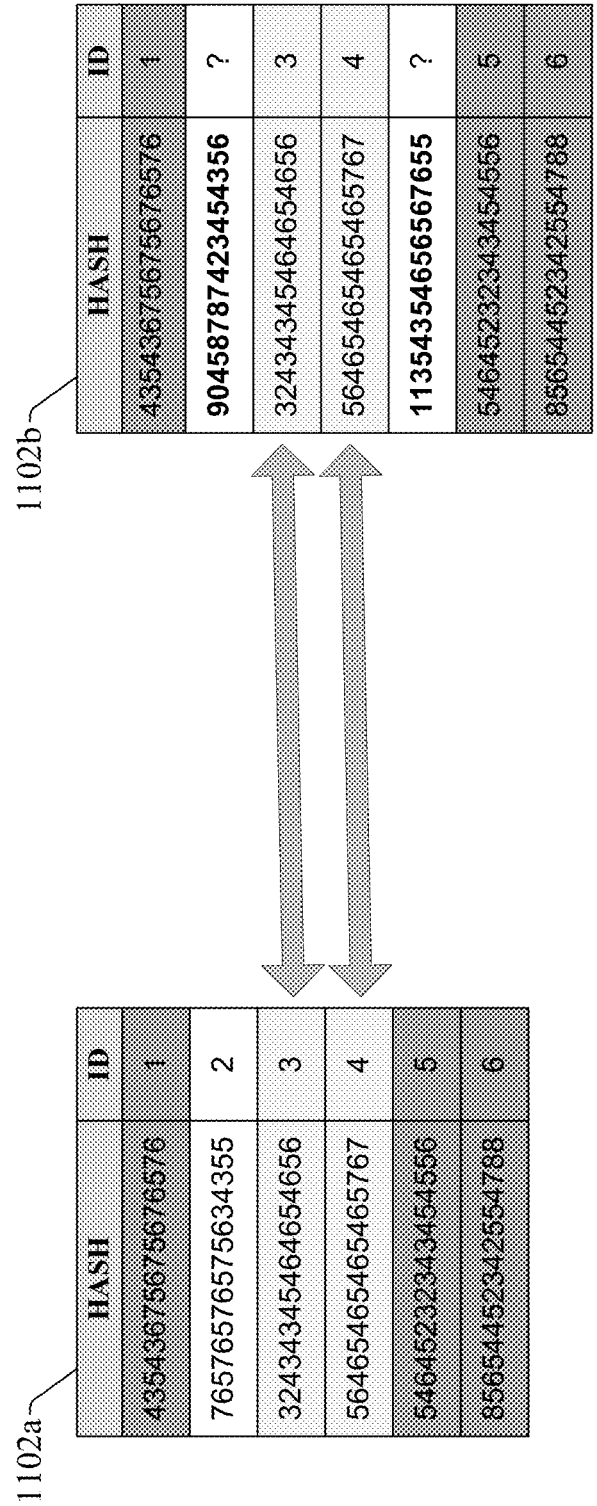
FIG. 17 is an illustration of a second phase of the difference detection processing.

FIG. 17 illustrates a second phase of the difference detection processing performed by the difference detection component 714. Once the matching entries at the beginning and end of the sets of hash data 1102 have been identified as described above (entries 1, 5, and 6 in FIG. 17), the difference detection component 714 analyzes the hash values between these sets of matching values to identify hash values that appear exactly once in both sets of hash data 1102, and to assign ID numbers to the matching values in the modified hash data 1102b equal to the ID numbers of their matching values in the initial hash data 1102a. In the example depicted in FIG. 17, the hash values with ID numbers 3 and 4 in the initial hash data 1102a are also found in the modified hash data 1102. Accordingly, the matching values in the modified hash data 1102b are assigned the ID numbers (3 and 4) corresponding to their matching values in the initial hash data 1102a.

Figure 18:
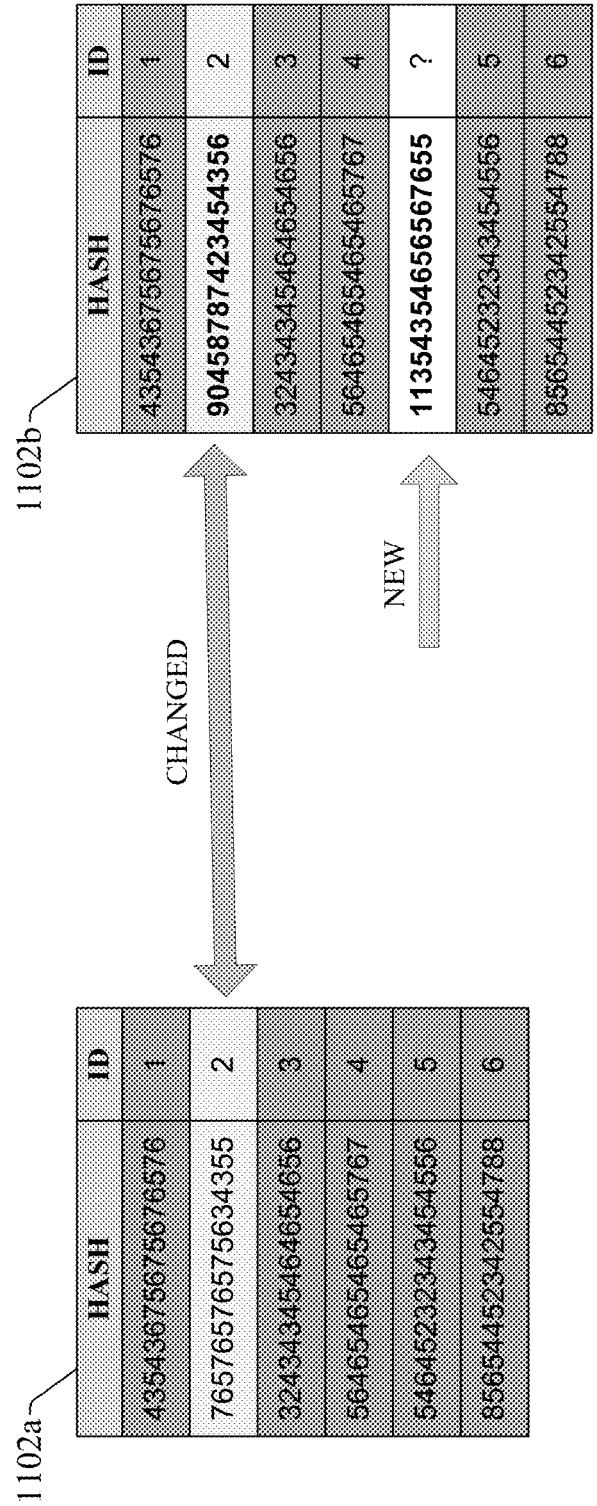
FIG. 18 is an illustration of a third phase of the difference detection processing.

Once these remaining matching entries have been discovered, any remaining entries in the modified hash data 1102b that have not yet been labeled with an ID number are examined FIG. 18 illustrates this third phase of the difference detection processing. In the present example, the two bold-faced hash values in the modified hash data 1102b have not been found to match any of the hash values of the initial hash data 1102a. Accordingly, the difference detection component 714 concludes that that each of these unlabeled, unmatched entries corresponds to either a modified rung of the control program or a newly added rung. The difference determination component 714 resolves this by comparing the remaining unmatched entries of the two sets of hash data 1102. In the present example, a first unmatched entry in the modified hash data 1102b is found between value IDs 1 and 3. Since a similarly unmatched entry is found between these two ID numbers in the initial hash data 1102a, the difference determination component 714 concludes that these two unmatched entries correspond to the same rung, and therefore represent a modified rung. The unmatched entry in the modified hash data 1102b is assigned the ID number of its corresponding entry in the initial hash data 1102a (ID=2), and the entry is flagged as a changed rung.

The second unmatched entry in the modified hash data 1102b (third from the bottom) does not have a corresponding unmatched entry in the same relative position in the initial hash data 1102a and is therefore assumed to correspond to a newly added rung that has been inserted between the rungs corresponding to ID numbers 4 and 5. Accordingly, this entry of the modified hash data 1102b is flagged as a newly added entry.

Although the present example does not illustrate a scenario in which a rung has been deleted, further analysis of the modified hash data 1102b can identify deleted rungs. For example, if there exists one or more unmatched entries in the initial hash data 1102a without corresponding unmatched entries in the same relative position in the modified hash data 1102, it is assumed that the one or more rungs corresponding to these unmatched entries have been deleted.

Difference detection component 714 can also identify rungs that have been moved within the text model 302 based on analysis of the modified hash data 1102b. For example, if identical hash values are found to appear in separate unmatched entries that do not have corresponding unmatched entries, as determined based on relative position, the entries are determined to correspond to a rung that has been moved to a new location within the program.

Returning now to FIG. 14, once the comparative analysis described above is complete, the difference detection component 714 generates difference data 1402 identifying hash value entries that have been modified, hash value entries that have been added, and hash value entries that have been deleted. The user interface component 704 can use this difference data 1402 to send targeted updates 604 (see FIG. 6) to any logic views of the control program that are being rendered on client-side development platforms. For example, user interface component 704 can perform targeted re-draws of each rung in the logic view corresponding to a modified hash entry to reflect the current state of that rung, as defined by the modified line of the text model 302. Similarly, the user interface component 704 can identify new lines of the text model 302 corresponding to newly added hash entries, and update the logic view to add the new rung of ladder logic corresponding to the new line of the text model 302. The user interface component 704 can also delete rungs from the logic view that correspond to initial hash data entries that have been deleted from the modified hash data 1102b. These logic view updates can be performed without redrawing the entirety of the logic view in the user's development interface.

Upon completion of these display updates, the modified hash data 1102b is redesignated as the initial hash data 1102a so that subsequent edits to the program are compared against the version of the hash data 1102 that reflects the new current state of the program.

In general, the control logic hashing and difference detection analysis described above can be performed each time an edit or a set of edits directed to a control program have been received at the IDE system 702. In a collaborative development environment as illustrated in FIG. 6, program edits 602 submitted by a first user can trigger generation of new modified hash data 1102b and initiation of difference detection analysis, and the IDE system 702 can use the resulting difference data 1402 to send targeted view updates 604 to the logic view of other developers currently viewing the control program.

Although the examples described herein considered hash data comprising a series of rung-level hash values, thus allowing the system to identify rungs that have been modified, some embodiments can be configured to generate the hash data at a higher level of granularity by including element-level or leg-level hash values, allowing the modified portions of the program to be identified with greater precision.

By combining the use of text differencing analysis using a patience difference algorithm with high-fidelity hashing of a control program as described herein, embodiments of IDE system 702 can efficiently update logic views of the control program without the need to redraw the entire logic view, while using less storage and communication bandwidth relative to approaches that require direct comparison between two versions of the object model or transmission of the object model to the client level. Model hashing can also allow for a compact, concise representation of the object model, thereby reducing memory requirements relative to these other approaches.

Figure 19:
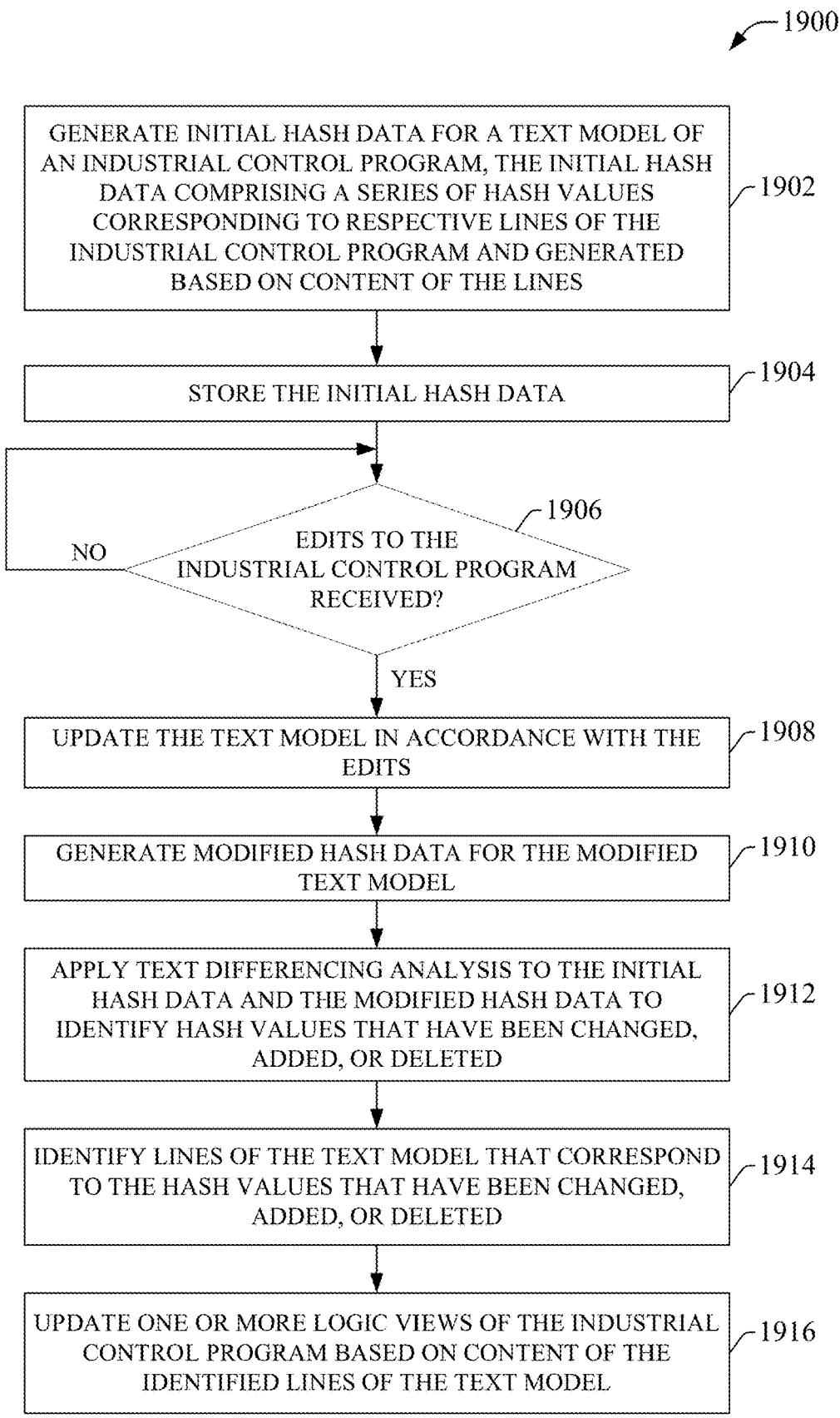
FIG. 19 is a flowchart of an example methodology for identifying modifications to an industrial control program for the purpose of generating targeted logic view updates.

FIG. 19 illustrates a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 19 illustrates an example methodology 1900 for identifying modifications to an industrial control program for the purpose of generating targeted logic view updates. Initially, at 1902, initial hash data for a text model of an industrial control program is generated. The industrial control program can be rendered in a development interface in ladder logic format, and the text model can represent the content of the control program as lines of plain text that represent content of respective rungs of the ladder logic program. The initial hash data can comprise a series of hash values corresponding to respective lines or rungs of the control program. The hash values are generated based on the content of the lines of the program. In an example embodiment, hash values can be generated for each program element and branch contained in a rung of the control program. For element-level hash values, the hashes can be generated for each program element based on the type of the program element as well as values of parameters associated with the element. An aggregate rung-level hash can then be generated for the rung based on an aggregation of the element and branch hashes computed for the rung. The initial hash data can comprise the resulting rung-level hashes generated for all rungs of the program, arranged in an order corresponding to the order of the rungs. At 1904, the initial hash data generated at step 1902 is stored.

At 1906, a determination is made as to whether edits to the industrial control program are received. The edits may comprise modifications to existing rungs, addition of new rungs, or deletion of rungs. If edits to the industrial control program are received (YES at step 1906), the methodology proceeds to step 1908, where the text model of the control program is updated in accordance with the edits. At 1910, modified hash data is generated for the modified text model obtained at step 1908. The modified hash data can be generated using the same hashing technique used to generate the initial hash data at step 1902.

At 1912, text differencing analysis is applied to the initial hash data and the modified hash data to identify hash values that have been changed, added, or deleted. In an example embodiment, the text differencing analysis can involve applying a patience difference algorithm to the initial and modified hash data to identify correspondences between hash values in the modified hash data and those in the initial hash data. Based on these identified correspondences, hash values that have been modified, added, or deleted can be identified.

At 1914, lines of the text model that correspond to the hash values that have been changed, added, or deleted can be identified. At 1916, one or more ladder logic views of the industrial control program rendered on respective development interfaces can be updated based on the content of the identified lines of the text model. For example, if a hash value of the modified hash data is found to have changed relative to its corresponding hash value in the initial hash data, the content of the line of the text model corresponding to this hash value can be translated to its corresponding ladder logic rung, and the rung of the logic view updated based on this translated line of the text model.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 20:
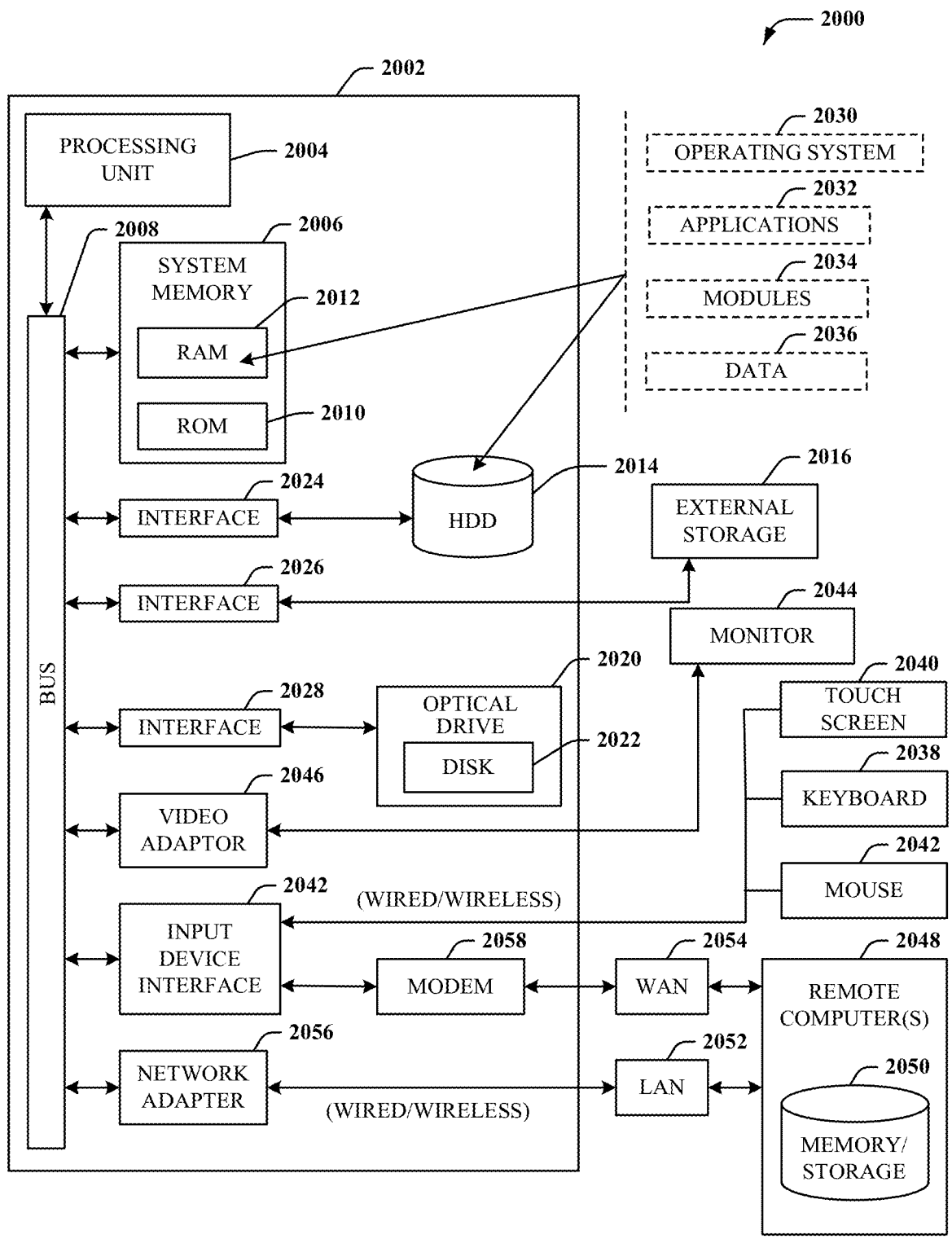
FIG. 20 is an example computing environment.
Figure 21:
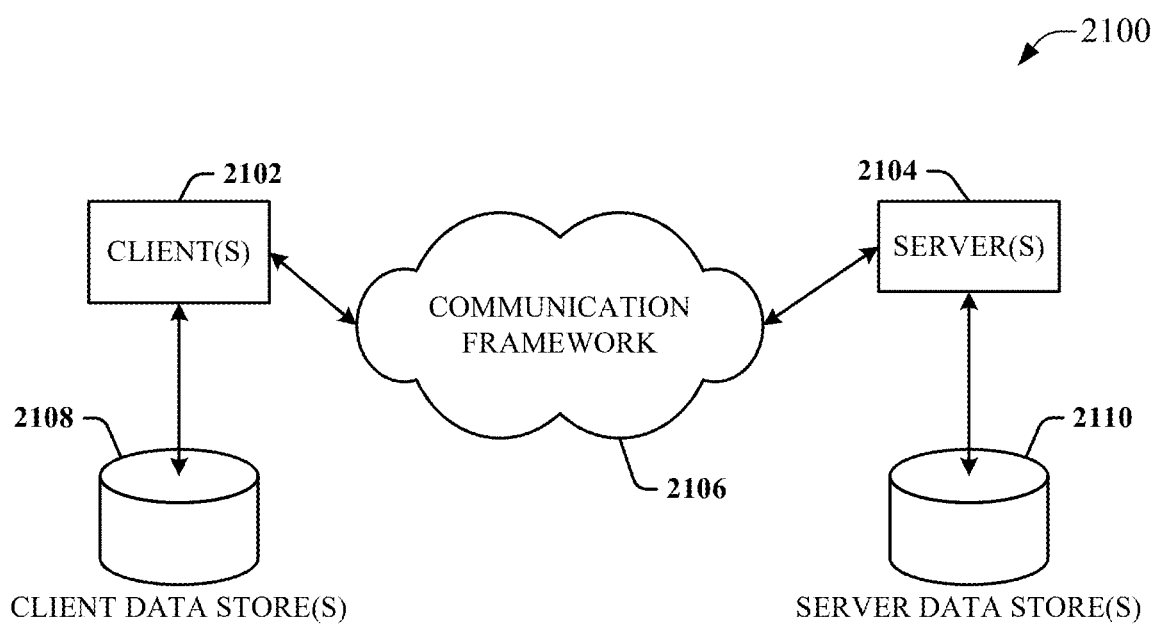
FIG. 21 is an example networking environment.

In order to provide a context for the various aspects of the disclosed subject matter, FIGS. 20 and 21 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 20 the example environment 2000 for implementing various embodiments of the aspects described herein includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes ROM 2010 and RAM 2012. A basic input/output system (BIOS) can be stored in a non-volatile memory such as ROM, erasable programmable read only memory (EPROM), EEPROM, which BIOS contains the basic routines that help to transfer information between elements within the computer 2002, such as during startup. The RAM 2012 can also include a high-speed RAM such as static RAM for caching data.

The computer 2002 further includes an internal hard disk drive (HDD) 2014 (e.g., EIDE, SATA), one or more external storage devices 2016 (e.g., a magnetic floppy disk drive (FDD) 2016, a memory stick or flash drive reader, a memory card reader, etc.) and an optical disk drive 2020 (e.g., which can read or write from a CD-ROM disc, a DVD, a BD, etc.). While the internal HDD 2014 is illustrated as located within the computer 2002, the internal HDD 2014 can also be configured for external use in a suitable chassis (not shown). Additionally, while not shown in environment 2000, a solid state drive (SSD) could be used in addition to, or in place of, an HDD 2014. The HDD 2014, external storage device(s) 2016 and optical disk drive 2020 can be connected to the system bus 2008 by an HDD interface 2024, an external storage interface 2026 and an optical drive interface 2028, respectively. The interface 2024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. The systems and methods described herein can be implemented utilizing various commercially available operating systems or combinations of operating systems.

Computer 2002 can optionally comprise emulation technologies. For example, a hypervisor (not shown) or other intermediary can emulate a hardware environment for operating system 2030, and the emulated hardware can optionally be different from the hardware illustrated in FIG. 20. In such an embodiment, operating system 2030 can comprise one virtual machine (VM) of multiple VMs hosted at computer 2002. Furthermore, operating system 2030 can provide runtime environments, such as the Java runtime environment or the .NET framework, for application programs 2032. Runtime environments are consistent execution environments that allow application programs 2032 to run on any operating system that includes the runtime environment. Similarly, operating system 2030 can support containers, and application programs 2032 can be in the form of containers, which are lightweight, standalone, executable packages of software that include, e.g., code, runtime, system tools, system libraries and settings for an application.

Further, computer 2002 can be enable with a security module, such as a trusted processing module (TPM). For instance with a TPM, boot components hash next in time boot components, and wait for a match of results to secured values, before loading a next boot component. This process can take place at any layer in the code execution stack of computer 2002, e.g., applied at the application execution level or at the operating system (OS) kernel level, thereby enabling security at any level of code execution.

A user can enter commands and information into the computer 2002 through one or more wired/wireless input devices, e.g., a keyboard 2038, a touch screen 2040, and a pointing device, such as a mouse 2024. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2004 through an input device interface 2044 that can be coupled to the system bus 2008, but can be connected by other interfaces, such as a parallel port, an IEEE 1394 serial port, a game port, a USB port, an IR interface, a BLUETOOTH® interface, etc.

A monitor 2044 or other type of display device can be also connected to the system bus 2008 via an interface, such as a video adapter 2046. In addition to the monitor 2044, a computer typically includes other peripheral output devices (not shown), such as speakers, printers, etc.

The computer 2002 can operate in a networked environment using logical connections via wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which can connect to a global communications network, e.g., the Internet.

When used in a LAN networking environment, the computer 2002 can be connected to the local network 2052 through a wired and/or wireless communication network interface or adapter 2056. The adapter 2056 can facilitate wired or wireless communication to the LAN 2052, which can also include a wireless access point (AP) disposed thereon for communicating with the adapter 2056 in a wireless mode.

When used in a WAN networking environment, the computer 2002 can include a modem 2058 or can be connected to a communications server on the WAN 2054 via other means for establishing communications over the WAN 2054, such as by way of the Internet. The modem 2058, which can be internal or external and a wired or wireless device, can be connected to the system bus 2008 via the input device interface 2024. In a networked environment, program modules depicted relative to the computer 2002 or portions thereof, can be stored in the remote memory/storage device 2050. It will be appreciated that the network connections shown are example and other means of establishing a communications link between the computers can be used.

When used in either a LAN or WAN networking environment, the computer 2002 can access cloud storage systems or other network-based storage systems in addition to, or in place of, external storage devices 2016 as described above. Generally, a connection between the computer 2002 and a cloud storage system can be established over a LAN 2052 or WAN 2054 e.g., by the adapter 2056 or modem 2058, respectively. Upon connecting the computer 2002 to an associated cloud storage system, the external storage interface 2026 can, with the aid of the adapter 2056 and/or modem 2058, manage storage provided by the cloud storage system as it would other types of external storage. For instance, the external storage interface 2026 can be configured to provide access to cloud storage sources as if those sources were physically connected to the computer 2002.

The computer 2002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 21 is a schematic block diagram of a sample computing environment 2100 with which the disclosed subject matter can interact. The sample computing environment 2100 includes one or more client(s) 2102. The client(s) 2102 can be hardware and/or software (e.g., threads, processes, computing devices). The sample computing environment 2100 also includes one or more server(s) 2104. The server(s) 2104 can also be hardware and/or software (e.g., threads, processes, computing devices). The servers 2104 can house threads to perform transformations by employing one or more embodiments as described herein, for example. One possible communication between a client 2102 and servers 2104 can be in the form of a data packet adapted to be transmitted between two or more computer processes. The sample computing environment 2100 includes a communication framework 2106 that can be employed to facilitate communications between the client(s) 2102 and the server(s) 2104. The client(s) 2102 are operably connected to one or more client data store(s) 2108 that can be employed to store information local to the client(s) 2102. Similarly, the server(s) 2104 are operably connected to one or more server data store(s) 2110 that can be employed to store information local to the servers 2104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory; and
a processor, operatively coupled to the memory that executes executable components stored on the memory, wherein the executable components comprise:
a user interface component configured to display a program development interface on a client device, the program development interface configured to render a logic view of an industrial control program;
a project generation component configured to generate a text model of the industrial control program in accordance with programming input submitted via the user interface component;
a hashing component configured to
generate initial hash data based on content of the text model, and
in response to receipt of one or more edits to the industrial control program, generate modified hash data based on updated content of the text model; and
a difference detection component configured to identify portions of the industrial control program that have been modified by the one or more edits based on comparative analysis of the initial hash data and the modified hash data,
wherein the user interface component is further configured to perform targeted updates to the logic view of the industrial control program, the targeted updates directed to the portions of the industrial control program identified by the difference detection component.

2. The system of claim 1, wherein the hashing component is configured to, for a line of the industrial control program,
generate element-level hash values for respective program elements included in the line,
generate leg-level hash values for respective legs of the line, and
generate a rung-level hash value based on an aggregation of the element-level hash values and the leg-level hash values,
wherein the initial hash data and the modified hash data comprise at least one of the rung-level hash value, the leg-level hash values, or the element-level hash values.

3. The system of claim 2, wherein the hashing component generates one of the element-level hash values for a program element based on a type of the program element and values of one or more parameters associated with the program element.

4. The system of claim 3, wherein the program element is at least one of a normally open contact, a normally closed contact, an output coil, a timer, a counter, or an instruction block.

5. The system of claim 2, wherein the leg-level hash values are based on aggregations of element-level hash value calculated for program elements contained on the respective legs.

6. The system of claim 1, wherein the comparative analysis is a patience difference algorithm.

7. The system of claim 1, wherein the comparative analysis
- identifies correspondences between values of the modified hash data and corresponding values of the initial hash data,
- identifies a value of the modified hash data that has changed relative to its corresponding value in the initial hash data, and
- identifies, as one of the portions of the industrial control program that have been modified, a rung of the industrial control program corresponding to the value of the modified hash data.

8. The system of claim 1, wherein the comparative analysis
- identifies correspondences between values of the modified hash data and corresponding values of the initial hash data,
- identifies a value of the modified hash data that does not have a corresponding value in the initial hash data, and
- identifies, as one of the portions of the industrial control program that has changed, a newly added logic rung corresponding to the value of the modified hash data.

9. The system of claim 1, wherein the comparative analysis
- identifies correspondences between values of the modified hash data and corresponding values of the initial hash data,
- identifies a value of the initial hash data that does not have a corresponding value in the modified hash data, and
- identifies, as one of the portions of the industrial control program that has changed, a deleted logic rung corresponding to the value of the initial hash data.

10. The system of claim 1, wherein the user interface component is configured to display the program development interface via a web browser.

11. A method, comprising:
- generating, by a system comprising a processor, a text model of an industrial control program;
- rendering, by the system, a logic view of the industrial control program on a client device via a program development interface;
- generating, by the system, initial hash data based on content of the text model; and
- in response to receipt of one or more edits to the industrial control program:
  - generating, by the system, modified hash data based on updated content of the text model;
  - identifying, by the system, portions of the industrial control program that have been modified by the one or more edits based on comparative analysis of the initial hash data and the modified hash data; and
  - performing, by the system, targeted updates to portions of the logic view corresponding to the portions of the industrial control program.

12. The method of claim 11, wherein the generating of the initial hash data and the generating of the modified hash data respectively comprise:
- generating, for a line of the industrial control program, element-level hash values for respective program elements included in the line,
- generating leg-level hash values for respective legs of the line, and
- generating a rung-level hash value based on an aggregation of the element-level hash values and the leg-level hash values, and
- generating the initial hash data and the modified hash data to include at least one of the rung-level hash value, the leg-level hash values, or the element-level hash values.

13. The method of claim 12, wherein the generating of the element-level hash values comprises generating one of the element-level hash values for a program element of the industrial control program based on a type of the program element and values of one or more parameters associated with the program element.

14. The method of claim 13, wherein the program element is at least one of a normally open contact, a normally closed contact, an output coil, a timer, a counter, or an instruction block.

15. The method of claim 11, wherein the comparative analysis is a patience difference algorithm.

16. The method of claim 11, wherein the identifying of the portions of the industrial control program comprises:
- identifying correspondences between values of the modified hash data and corresponding values of the initial hash data,
- identifying a value of the modified hash data that has changed relative to its corresponding value in the initial hash data, and
- identifying, as one of the portions of the industrial control program that have been modified, a rung of the industrial control program corresponding to the value of the modified hash data.

17. The method of claim 11, wherein the identifying of the portions of the industrial control program comprises:
- identifying correspondences between values of the modified hash data and corresponding values of the initial hash data,
- identifying a value of the modified hash data that does not have a corresponding value in the initial hash data, and
- identifying, as one of the portions of the industrial control program that has changed, a newly added logic rung corresponding to the value of the modified hash data.

18. The method of claim 11, wherein the identifying of the portions of the industrial control program comprises:
- identifying correspondences between values of the modified hash data and corresponding values of the initial hash data,
- identifying a value of the initial hash data that does not have a corresponding value in the modified hash data, and
- identifying, as one of the portions of the industrial control program that has changed, a deleted logic rung corresponding to the value of the initial hash data.

19. A non-transitory computer-readable medium having stored thereon instructions that, in response to execution, cause a system comprising a processor to perform operations, the operations comprising:
- generating a text model of an industrial control program;
- rendering a logic view of the industrial control program on a client device via a program development interface;
- generating initial hash data based on content of the text model; and
- in response to receipt of one or more edits to the industrial control program:
  - generating modified hash data based on updated content of the text model;
  - identifying portions of the industrial control program that have been modified by the one or more edits based on comparative analysis of the initial hash data and the modified hash data; and performing targeted updates to portions of the logic view corresponding to the portions of the industrial control program.

20. The non-transitory computer-readable medium of claim 19, wherein the generating of the initial hash data and the generating of the modified hash data respectively comprise:

generating, for a line of the industrial control program, element-level hash values for respective program elements included in the line, generating leg-level hash values for respective legs of the line, and generating a rung-level hash value based on an aggregation of the element-level hash values and the leg-level hash values, and generating the initial hash data and the modified hash data to include at least one of the rung-level hash value, the leg-level hash values, or the element-level hash values.

\* \* \* \* \*